(12) United States Patent
Takagi

(10) Patent No.: US 12,196,306 B2
(45) Date of Patent: Jan. 14, 2025

(54) ANNULAR BODY, WAVE REDUCER, AND ROBOT

(71) Applicant: Nidec-Shimpo Corporation, Nagaokakyo (JP)

(72) Inventor: Daisuke Takagi, Nagaokakyo (JP)

(73) Assignee: Nidec-Shimpo Corporation, Kyoto (JP)

( * ) Notice: Subject to any disclaimer, the term of this patent is extended or adjusted under 35 U.S.C. 154(b) by 0 days.

(21) Appl. No.: 18/104,921

(22) Filed: Feb. 2, 2023

(65) Prior Publication Data
US 2023/0258257 A1  Aug. 17, 2023

(30) Foreign Application Priority Data

Feb. 4, 2022 (JP) ................................. 2022-016290

(51) Int. Cl.
| | |
|---|---|
| *F16H 57/01* | (2012.01) |
| *B25J 9/10* | (2006.01) |
| *F16H 49/00* | (2006.01) |
| *G01L 3/10* | (2006.01) |

(52) U.S. Cl.
CPC .............. *F16H 57/01* (2013.01); *B25J 9/102* (2013.01); *F16H 49/001* (2013.01); *G01L 3/108* (2013.01); *F16H 2057/012* (2013.01)

(58) Field of Classification Search
CPC ....... F16H 49/001; G01L 3/108; B25J 9/1025
See application file for complete search history.

(56) References Cited

U.S. PATENT DOCUMENTS

| | | | | |
|---|---|---|---|---|
| 6,000,289 A | * | 12/1999 | Horiuchi | G01L 3/101 73/862.325 |
| 6,170,340 B1 | * | 1/2001 | Horiuchi | G01L 3/1464 73/862.321 |
| 6,962,088 B2 | * | 11/2005 | Horiuchi | F16H 49/001 73/862.338 |
| 2019/0226929 A1 | * | 7/2019 | Suzuki | G01L 1/22 |
| 2021/0354291 A1 | * | 11/2021 | Heim | G01L 3/1457 |
| 2022/0034392 A1 | * | 2/2022 | Damerau | F16H 49/001 |

FOREIGN PATENT DOCUMENTS

| | | |
|---|---|---|
| DE | 198 20 882 C1 | 10/1999 |
| JP | 2000-131160 A | 5/2000 |
| JP | 2016-205861 A | 12/2016 |

* cited by examiner

*Primary Examiner* — Jake Cook
(74) *Attorney, Agent, or Firm* — Keating & Bennett, LLP

(57) ABSTRACT

An annular body includes a base, a first resistance wire, a second resistance wire, a first terminal, and a second terminal. The base surrounds a central axis and expands in a direction intersecting the central axis. Resistance values of the first and second resistance wires change according to strain of the base. The first terminal is electrically connected to the end of the first resistance wire. The second terminal is electrically connected to an end of the second resistance wire. The first terminal is at a first position in the circumferential direction. The second terminal is at a second position in the circumferential direction. When viewed in the axial direction, the central angle defined by the first position, the central axis, and the second position is equal to or greater than about 90°.

20 Claims, 15 Drawing Sheets

ANNULAR BODY, WAVE REDUCER, AND ROBOT

CROSS-REFERENCE TO RELATED APPLICATIONS

The present application claims priority under 35 U.S.C. § 119 to Japanese Patent Application No. 2022-016290, filed on Feb. 4, 2022, the entire contents of which are hereby incorporated herein by reference.

1. FIELD OF THE INVENTION

The present disclosure relates to an annular body, a wave reducer, and a robot.

2. BACKGROUND

In recent years, demand for a wave reducer equipped on a joint of a robot and the like is increasing. A conventional wave reducer has a strain gauge. The strain gauge is attached to an externally toothed gear that rotates at a rotational speed after deceleration. This enables detection of torque applied to the externally toothed gear.

In order to improve the reliability of torque detection, it is conceivable to arrange two sets of resistance wire portions including a strain gauge on the externally toothed gear. However, when a terminal of one resistance wire portion and a terminal of the other resistance wire portion are arranged at the same circumferential position, the same stress is applied to the two terminals. That is, there is a high possibility that a load is simultaneously applied to the two terminals.

SUMMARY

An example embodiment of the present disclosure is an annular body including: a base surrounding a central axis and expanding in a direction intersecting the central axis; a first resistance wire portion having a resistance value changing in accordance with strain of the base; a second resistance wire portion having a resistance value changing in accordance with the strain of the base; a first terminal electrically connected to an end of the first resistance wire portion and arranged in a first position in a circumferential direction; and a second terminal electrically connected to an end of the second resistance wire portion and arranged in a second position in a circumferential direction, in which a central angle formed by the first position, the central axis, and the second position is equal to or greater than 90° when viewed in an axial direction.

The above and other elements, features, steps, characteristics and advantages of the present disclosure will become more apparent from the following detailed description of the example embodiments with reference to the attached drawings.

DETAILED DESCRIPTION

Hereinafter, an example embodiment of the present application will be described with reference to the drawings.

Figure 1:
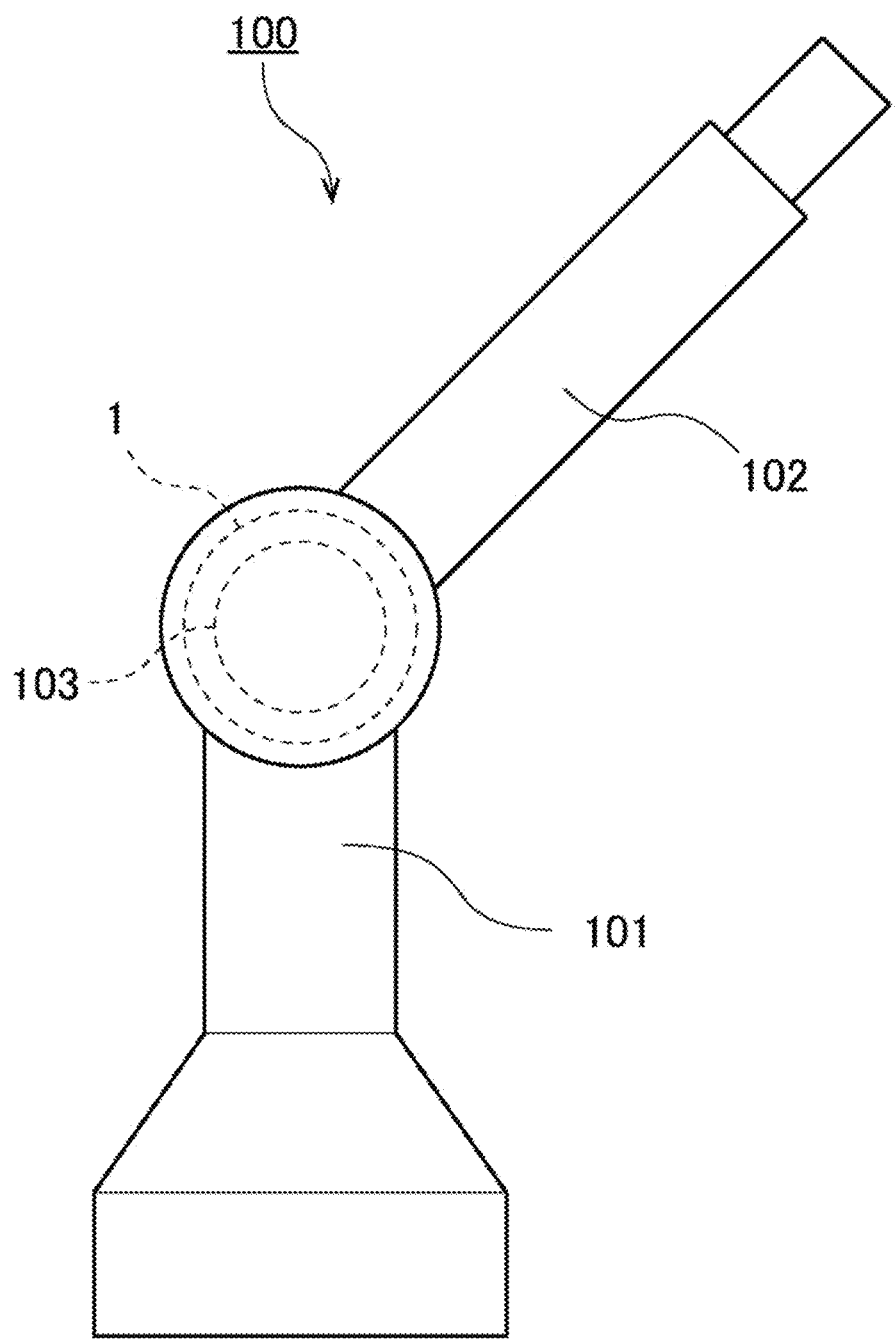
FIG. 1 is a schematic view of a robot according to a preferred embodiment of the present disclosure.

FIG. 1 is a schematic view of a robot 100 equipped with a wave reducer 1 according to one example embodiment. For example, the robot 100 is what is called an industrial robot that performs operations such as conveyance, processing, and assembly of components in a manufacturing line of an industrial product. As shown in FIG. 1, the robot 100 includes a base frame 101, an arm 102, a motor 103, and the wave reducer 1.

The arm 102 is pivotally supported with respect to the base frame 101. The motor 103 and the wave reducer 1 are incorporated in a joint between the base frame 101 and the arm 102. When a drive current is supplied to the motor 103, a rotational motion is output from the motor 103. The rotational motion output from the motor 103 is decelerated by the wave reducer 1 and transmitted to the arm 102. Due to this, the arm 102 pivots with respect to the base frame 101 at a speed after deceleration.

As described above, the robot 100 includes the wave reducer 1. As described below, since a first terminal 43 and a second terminal 44 of the wave reducer 1 are arranged at circumferentially different positions, the probability that a load is applied at the same time is low. Therefore, for example, even if one of the first terminal 43 and the second terminal 44 no longer functions, the probability that the other terminal functions is high. This makes it possible to achieve the robot 100 having a high reliability.

Subsequently, a detailed structure of the wave reducer 1 will be described.

Hereinafter, a direction parallel to a central axis 9 of the wave reducer 1 is referred to as "axial", a direction orthogonal to the central axis 9 of the wave reducer 1 is referred to as "radial", and a direction along an arc about the central axis 9 of the wave reducer 1 is referred to as "circumferential". The "parallel" mentioned above includes "substantially parallel". The "orthogonal" mentioned above includes "substantially orthogonal".

Figure 2:
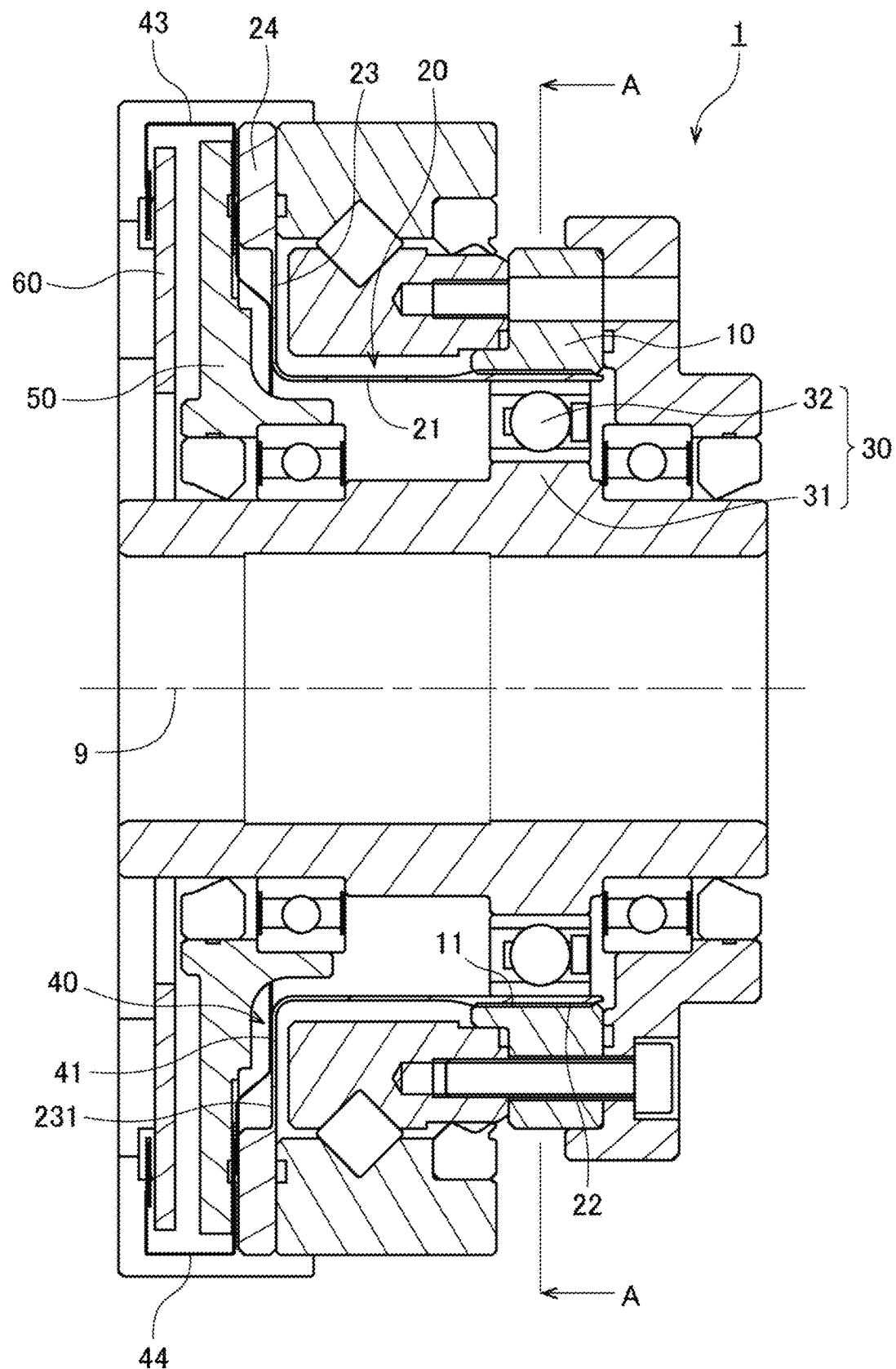
FIG. 2 is a longitudinal cross-sectional view of a reducer according to a preferred embodiment of the present disclosure.
Figure 3:
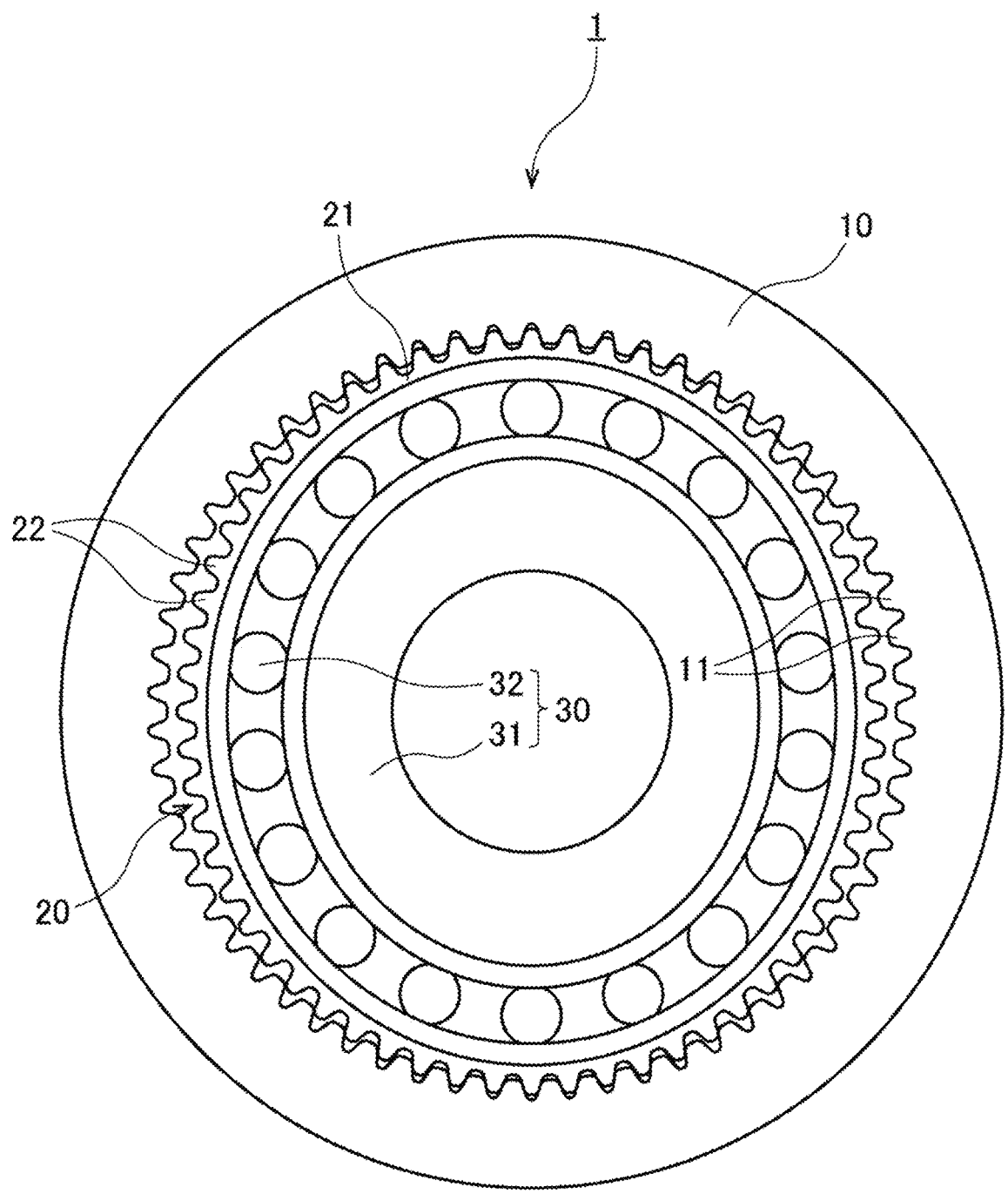
FIG. 3 is a transverse cross-sectional view of the reducer according to a preferred embodiment of the present disclosure.

FIG. 2 is a longitudinal cross-sectional view of the wave reducer 1 according to one example embodiment. FIG. 3 is a transverse cross-sectional view of the wave reducer 1 viewed from A-A position in FIG. 2. To avoid complication of the drawings, hatching that indicates a cross section is not shown in FIG. 3. The wave reducer 1 is a device that decelerates a rotational motion at a first rotational speed obtained from the motor 103 to a second rotational speed slower than the first rotational speed. The wave reducer 1 includes an internally toothed gear 10, an annular body 20, and a wave generator 30.

As described below, in the wave reducer 1, the first terminal 43 and the second terminal 44 are arranged at circumferentially different positions. Therefore, there is a low probability that a load is simultaneously applied to the first terminal 43 and the second terminal 44. Therefore, for example, even if one of the first terminal 43 and the second terminal 44 no longer functions, the probability that the other terminal functions is high. This makes it possible to achieve the wave reducer 1 having a high reliability.

The internally toothed gear 10 is an annular gear about the central axis 9. The internally toothed gear 10 is fixed to the arm 102. The internally toothed gear 10 meshes with the annular body 20. The internally toothed gear 10 is arranged radially outside an external tooth 22 described below. Rigidity of the internally toothed gear 10 is sufficiently higher than rigidity of a body 21 described below of the annular body 20. For this reason, the internally toothed gear 10 can be regarded as a substantially rigid body. The internally toothed gear 10 has a plurality of internal teeth 11. The plurality of internal teeth 11 protrude radially inward from a radially inner surface of the internally toothed gear 10. The plurality of internal teeth 11 are arrayed at a constant pitch in the circumferential direction on an inner periphery of the internally toothed gear 10.

The annular body 20 is an annular gear that is flexurally deformable. The annular body 20 is fixed to the base frame 101. The annular body 20 is supported rotatably about the central axis 9. As shown in FIGS. 2 and 3, the annular body 20 has a base 23. The annular body 20 of the present example embodiment further includes the body 21, a plurality of the external teeth 22, and a thick part 24.

The body 21 is a tubular part extending in a direction including an axial component from a radial end of the base 23 described below. In the present example embodiment, one axial end of the body 21 is connected to the base 23. The body 21 extends from the radially inner end of the base 23 toward the other axial side. The end on the other axial side of the body 21 is positioned radially outside the wave generator 30 and radially inside the internally toothed gear 10. Since the body 21 has flexibility, the body 21 is radially deformable. In particular, the other axial end of the body 21 is radially displaceable more than another part.

The plurality of external teeth 22 protrude radially outward from a radially outer surface of the body 21. The plurality of external teeth 22 are arranged on the radially outer surface of the other axial end of the body 21. The plurality of external teeth 22 are arrayed at a constant pitch in the circumferential direction. A part of the plurality of external teeth 22 and a part of a plurality of the internal teeth 11 described above mesh with each other. The number of the internal teeth 11 included in the internally toothed gear 10 is slightly different from the number of the external teeth 22 included in the annular body 20.

The base 23 surrounds the central axis 9 and expands in a direction intersecting the central axis 9. The base 23 preferably extends along a plane orthogonal to the central axis 9. The base 23 expands radially outward from an end on one axial side of the body 21. The base 23 has an annular shape surrounding the central axis 9. Since the base 23 is thin, it is slightly flexurally deformable.

The thick part 24 is an annular part positioned radially outside the base 23. The thick part 24 further expands radially outward from the radially outer end of the base 23. The axial thickness of the thick part 24 is larger than the axial thickness of the base 23. The thick part 24 is fixed to the base frame 101 with, for example, a bolt.

The wave generator 30 is a mechanism that generates flexural deformation in the annular body 20. The wave generator 30 is arranged radially inside the external teeth 22. The wave generator 30 of the present example embodiment includes a cam 31 and a flexible bearing 32. The cam 31 is supported rotatably about the central axis 9. A radially outer surface of the cam 31 has an elliptical shape when viewed in the axial direction. The flexible bearing 32 is a flexurally deformable bearing. The flexible bearing 32 is arranged between the radially outer surface of the cam 31 and the radially inner surface of the body 21 of the annular body 20. Accordingly, the cam 31 and the body 21 can rotate at different rotational speeds.

An inner ring of the flexible bearing 32 comes into contact with the radially outer surface of the cam 31. An outer ring of the flexible bearing 32 comes into contact with the radially inner surface of the body 21. For this reason, the body 21 is deformed in an elliptical shape along the radially outer surface of the cam 31. As a result, the external teeth 22 of the annular body 20 and the internal teeth 11 of the internally toothed gear 10 mesh with each other at two location corresponding to both ends of a major axis of the ellipse. At other circumferential positions, the external teeth 22 and the internal teeth 11 do not mesh with each other.

The cam 31 is connected to an output shaft (not illustrated) of the motor 103. When the motor 103 is driven, the cam 31 rotates at the first rotational speed about the central axis 9. Due to this, the major axis of the above-described ellipse of the annular body 20 also rotates at the first rotational speed. Then, the meshing position between the external teeth 22 and the internal teeth 11 also changes at the first rotational speed in the circumferential direction. As described above, the number of the internal teeth 11 of the internally toothed gear 10 is slightly different from the number of the external teeth 22 of the annular body 20. Due to this difference in the number of teeth, the meshing position between the external teeth 22 and the internal teeth 11 slightly changes in the circumferential direction every rotation of the cam 31. As a result, the annular body 20 rotates about the central axis 9 with respect to the internally toothed gear 10 at the second rotational speed slower than the first rotational speed.

The annular body 20 includes a torque sensor 40. The torque sensor 40 is a sensor for detecting torque applied to the base 23. As shown in FIG. 2, the torque sensor 40 includes a first substrate 41. That is, the annular body 20 includes the first substrate 41. The first substrate 41 is fixed to the base 23. The base 23 has a surface 231 that intersects the central axis 9 and expands in an annular shape about the central axis 9. The surface 231 is a plane on one axial side of the base 23. The first substrate 41 is fixed to the surface 231 of the base 23.

Figure 4:
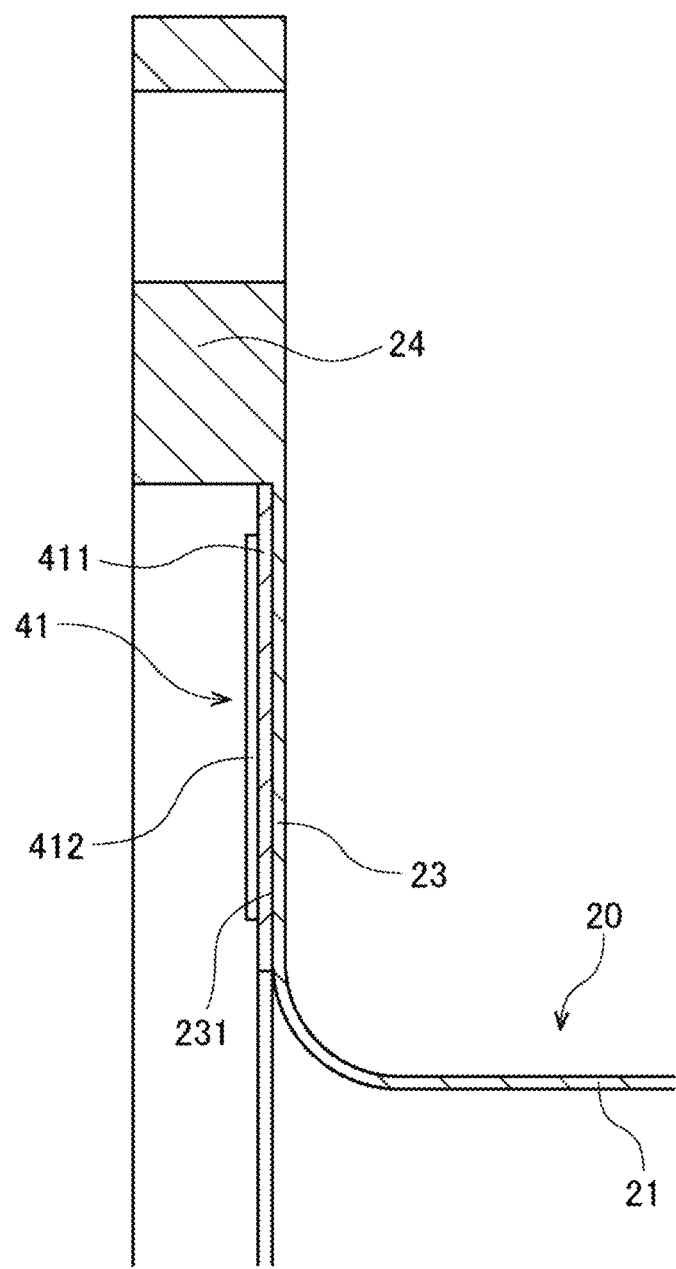
FIG. 4 is a partial longitudinal cross-sectional view of an annular body according to a preferred embodiment of the present disclosure.
Figure 5:
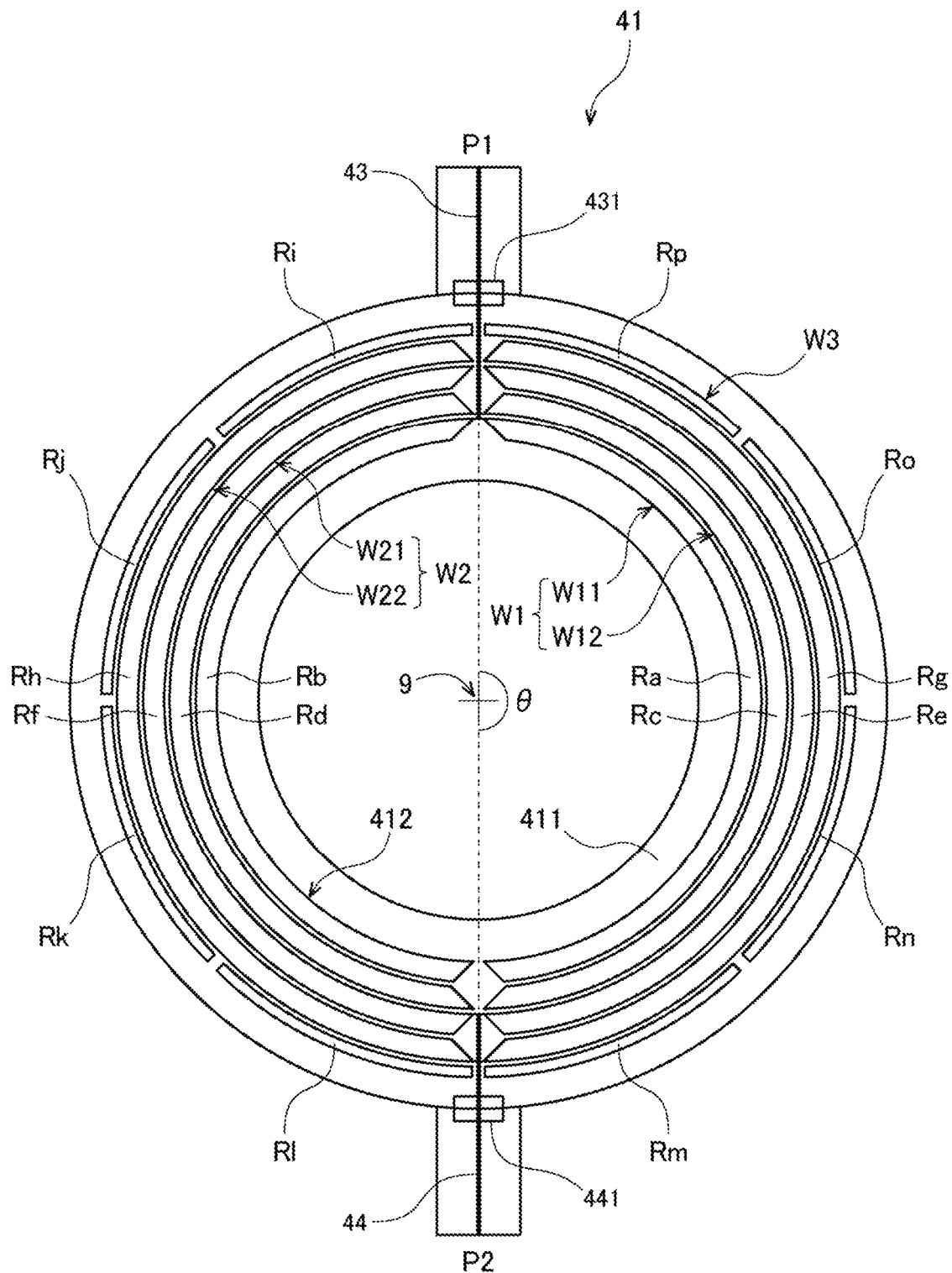
FIG. 5 is a plan view of a first substrate according to a preferred embodiment of the present disclosure.

FIG. 4 is a partial longitudinal cross-sectional view of the annular body 20 near the first substrate 41. FIG. 5 is a plan view of the first substrate 41. As shown in FIGS. 4 and 5, the first substrate 41 includes an insulating layer 411 and a resistance wire 412.

The insulating layer 411 is a flexibly deformable. The insulating layer 411 expands in a direction intersecting the central axis 9. The insulating layer 411 has an annular shape about the central axis 9. The insulating layer 411 is made from resin that is an insulator or an inorganic insulating material. The insulating layer 411 is arranged on the surface 231 of the base 23.

The resistance wire 412 is formed on a surface of the insulating layer 411. That is, the resistance wire 412 is arranged on the base 23. A conductive metal is used as a material of the resistance wire 412. For example, a copper alloy, a chromium alloy, or copper is used as a material of the resistance wire 412. The resistance wire 412 includes a first resistance wire portion W1 and a second resistance wire portion W2. That is, the annular body 20 includes the first resistance wire portion W1 and the second resistance wire portion W2. The resistance values of the first resistance wire portion W1 and the second resistance wire portion W2 change in accordance with the strain of the base 23.

The first resistance wire portion W1 and the second resistance wire portion W2 are arranged on a plane on one axial side of the base 23. In the present example embodiment, the first resistance wire portion W1 and the second resistance wire portion W2 are arranged on a plane on one axial side of the first substrate 41. The second resistance wire portion W2 is arranged radially outside relative to the first resistance wire portion W1. By arranging the first resistance wire portion W1 and the second resistance wire portion W2 on one surface of the base 23 as described above, it becomes easy to wire the first resistance wire portion W1 and the second resistance wire portion W2.

The first resistance wire portion W1 includes an inner first resistance wire portion W11 and an outer first resistance wire portion W12. The outer first resistance wire portion W12 is arranged radially outside relative to the inner first resistance wire portion W11.

The inner first resistance wire portion W11 has a plurality of first regions Ra and Rb. The plurality of first regions Ra and Rb are arranged at intervals in the circumferential direction. In the present example embodiment, the inner first resistance wire portion W11 has two of the first regions Ra and Rb. Each of the two first regions Ra and Rb is provided in a semicircular arc shape in a range of about 180° about the central axis 9. The two first regions Ra and Rb are arranged concentrically and line-symmetrically. The radial distance from the central axis 9 to the first region Ra is substantially equal to the radial distance from the central axis 9 to the first region Rb.

Figure 6:
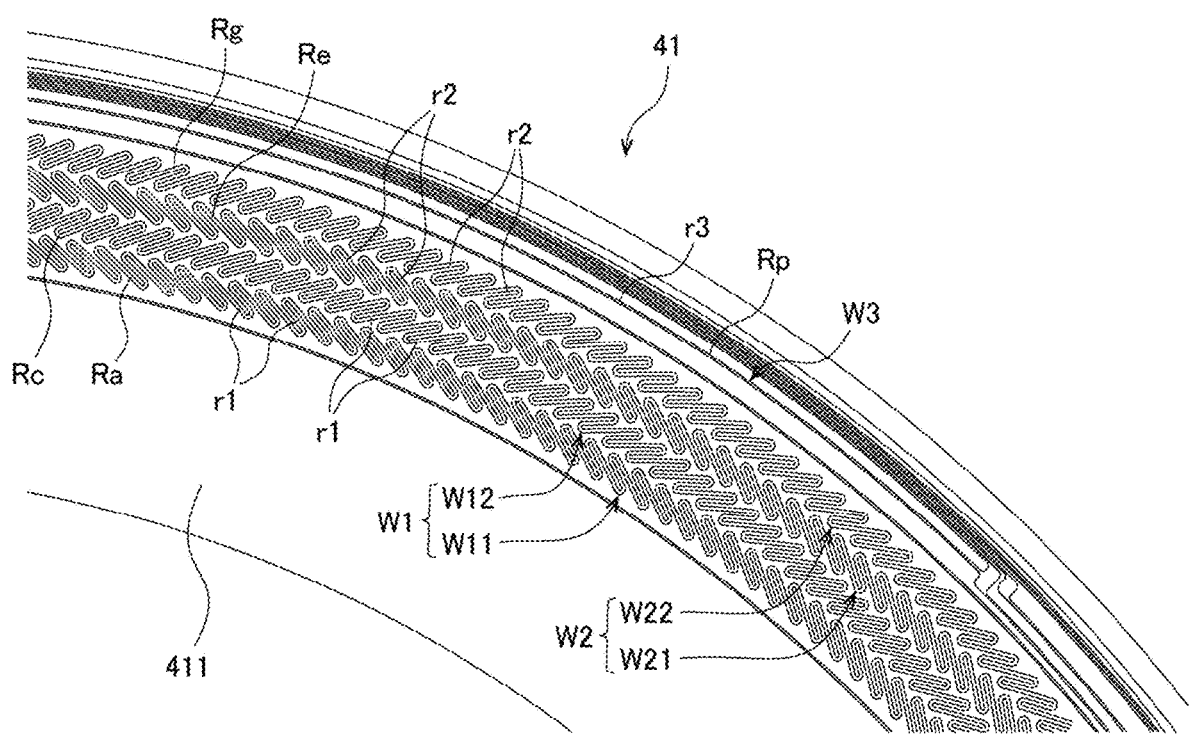
FIG. 6 is a partial plan view of the first substrate.

FIG. 6 is a partial plan view of the first substrate 41. As shown in FIG. 6, each of the plurality of first regions Ra and Rb includes a region in which a first site r1 extending in a direction having both radial and circumferential components is repeatedly arranged in the circumferential direction. Specifically, the two first regions Ra and Rb each extend in the circumferential direction with one conductive wire bent in a zigzag manner. A plurality of the first sites r1 are arrayed circumferentially in a posture substantially parallel to each other. The first site r1 of the first region Ra, which is one of the two first regions Ra and Rb, is inclined to one circumferential side with respect to the radial direction. The first site r1 of the first region Rb, which is the other, is inclined to the other circumferential side with respect to the radial direction. The inclination angle of the first site r1 with respect to the radial direction is 45°, for example. Ends of the first sites r1 adjacent circumferentially to each other are alternately connected radially inside or radially outside. Thus, the plurality of first sites r1 are connected in series as a whole.

The outer first resistance wire portion W12 has a plurality of first regions Rc and Rd. The plurality of first regions Rc and Rd are arranged at intervals in the circumferential direction. In the present example embodiment, the outer first resistance wire portion W12 has two of the first regions Rc and Rd. Each of the two first regions Rc and Rd is provided in a semicircular arc shape in a range of about 180° about the central axis 9. The two first regions Rc and Rd are arranged concentrically and line-symmetrically. The radial distance from the central axis 9 to the first region Rc is substantially equal to the radial distance from the central axis 9 to the first region Rd.

As shown in FIG. 6, each of the plurality of first regions Rc and Rd includes a region in which the first site r1 extending in a direction having both radial and circumferential components is repeatedly arranged in the circumferential direction. Specifically, the two first regions Rc and Rd each extend in the circumferential direction with one conductive wire bent in a zigzag manner. A plurality of the first sites r1 are arrayed circumferentially in a posture substantially parallel to each other. The first site r1 of the first region Rc, which is one of the two first regions Rc and Rd, is inclined to the other circumferential side with respect to the radial direction. The first site r1 of the first region Rd, which is the other, is inclined to one circumferential side with respect to the radial direction. The inclination angle of the first site r1 with respect to the radial direction is 45°, for example. Ends of the first sites r1 adjacent circumferentially to each other are alternately connected radially inside or radially outside. Thus, the plurality of first sites r1 are connected in series as a whole.

The second resistance wire portion W2 includes an inner second resistance wire portion W21 and an outer second resistance wire portion W22. The outer second resistance wire portion W22 is arranged radially outside relative to the inner second resistance wire portion W21.

The inner second resistance wire portion W21 has a plurality of second regions Re and Rf. The plurality of second regions Re and Rf are arranged at intervals in the circumferential direction. In the present example embodiment, the inner second resistance wire portion W21 has two of the second regions Re and Rf. Each of the two second regions Re and Rf is provided in a semicircular arc shape in a range of about 180° about the central axis 9. The two second regions Re and Rf are arranged concentrically and line-symmetrically. The radial distance from the central axis 9 to the second region Re is substantially equal to the radial distance from the central axis 9 to the second region Rf.

As shown in FIG. 6, each of the plurality of first regions Re and Rf includes a region in which a second site r2 extending in a direction having both radial and circumferential components is repeatedly arranged in the circumferential direction. Specifically, the two second regions Re and Rf each extend in the circumferential direction with one conductive wire bent in a zigzag manner. A plurality of the second site r2 are arrayed circumferentially in a posture substantially parallel to each other. The second site r2 of the second region Re, which is one of the two second regions Re and Rf, is inclined to one circumferential side with respect to the radial direction. The second site r2 of the second region Rf, which is the other, is inclined to the other circumferential side with respect to the radial direction. The inclination angle of the second site r2 with respect to the radial direction is 45°, for example. Ends of the second sites r2 adjacent circumferentially to each other are alternately connected radially inside or radially outside. Thus, the plurality of second sites r2 are connected in series as a whole.

The outer second resistance wire portion W22 has a plurality of second regions Rg and Rh. The plurality of second regions Rg and Rh are arranged at intervals in the circumferential direction. In the present example embodiment, the outer second resistance wire portion W22 has two of the second regions Rg and Rh. Each of the two second regions Rg and Rh is provided in a semicircular arc shape in a range of about 180° about the central axis 9. The two second regions Rg and Rh are arranged concentrically and line-symmetrically. The radial distance from the central axis 9 to the second region Rg is substantially equal to the radial distance from the central axis 9 to the second region Rh.

As shown in FIG. 6, each of the plurality of first regions Rg and Rh includes a region in which the second site r2 extending in a direction having both radial and circumferential components is repeatedly arranged in the circumferential direction. Specifically, the two second regions Rg and Rh each extend in the circumferential direction with one conductive wire bent in a zigzag manner. A plurality of the second site r2 are arrayed circumferentially in a posture substantially parallel to each other. The second site r2 of the second region Rg, which is one of the two second regions Rg and Rh, is inclined to the other circumferential side with respect to the radial direction. The second site r2 of the second region Rh, which is the other, is inclined to one circumferential side with respect to the radial direction. The inclination angle of the second site r2 with respect to the radial direction is 45°, for example. Ends of the second sites r2 adjacent circumferentially to each other are alternately connected radially inside or radially outside. Thus, the plurality of second sites r2 are connected in series as a whole.

Figure 7:
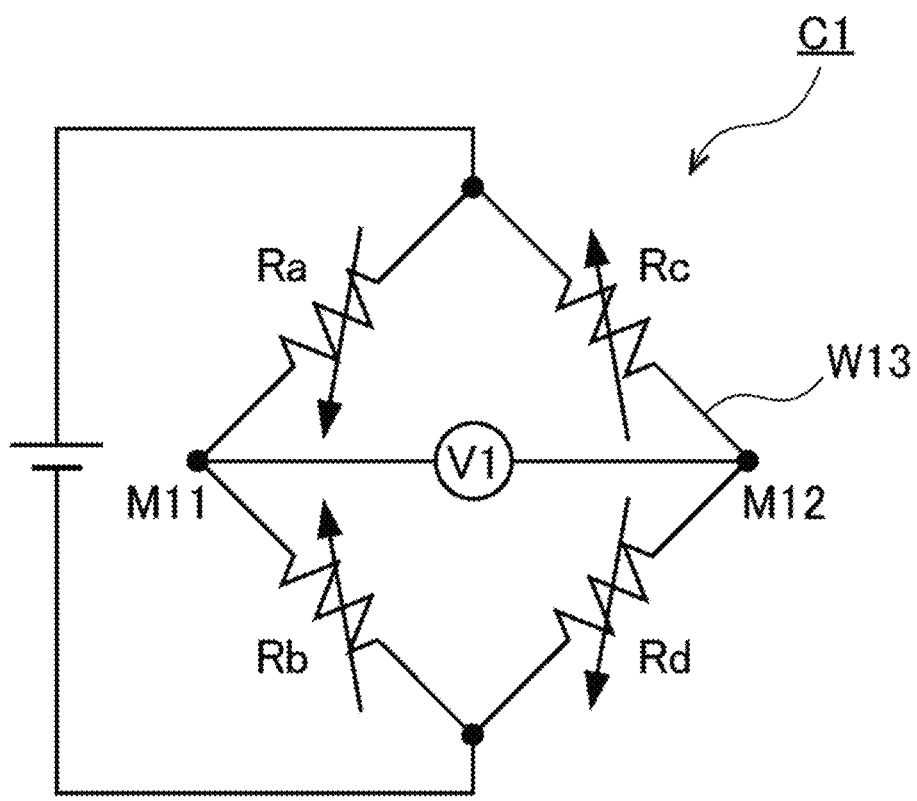
FIG. 7 is a circuit diagram of a first bridge circuit according to a preferred embodiment of the present disclosure.

FIG. 7 is a circuit diagram of a first bridge circuit C1 including four of the first regions Ra, Rb, Rc, and Rd of the first resistance wire portion W1. As shown in FIGS. 6 and 7, the first resistance wire portion W1 has a first connection region W13 connected to the four first regions Ra, Rb, Rc, and Rd. The four first regions Ra, Rb, Rc, and Rd are connected via the first connection region W13. Thus, the first bridge circuit C1 is formed.

The first region Ra and the first region Rb are connected in series in this order. The first region Rc and the first region Rd are connected in series in this order. Then, the row of the two first regions Ra and Rb and the row of the two first regions Rc and Rd are connected in parallel between a + pole and a − pole of a power source voltage. A middle point M11 between the two first regions Ra and Rb and a middle point M12 between the two first regions Rc and Rd are connected to a first voltmeter V1.

A resistance value of each of the first sites r1 changes in accordance with torque applied to the region where the resistance wire 412 is arranged. That is, in the present example embodiment, the resistance value of each of the first sites r1 of the four first regions Ra, Rb, Rc, and Rd changes in accordance with the torque applied to the base 23. For example, when the base 23 is applied with torque toward one circumferential side about the central axis 9, the resistance value of each of the first sites r1 of the two first regions Ra and Rd decreases, and the resistance value of each of the first sites r1 of the other two first regions Rb and Rc increases. On the other hand, when the base 23 is applied with torque toward the other circumferential side about the central axis 9, the resistance value of each of the first sites r1 of the two first regions Ra and Rd increases, and the resistance value of each of the first sites r1 of the other two first regions Rb and Rc decreases. As described above, the two first regions Ra and Rd and the two first regions Rb and Rc show resistance value changes reversely to each other with respect to the torque.

When the resistance value of each of the four first regions Ra, Rb, Rc, and Rd changes, a potential difference between the middle point M11 of the two first regions Ra and Rb and the middle point M12 of the two first regions Rc and Rd changes, and thus a measurement value of the first voltmeter V1 also changes. Therefore, the orientation and the magnitude of the torque applied to the base 23 can be detected based on the measurement value of the first voltmeter V1.

Figure 8:
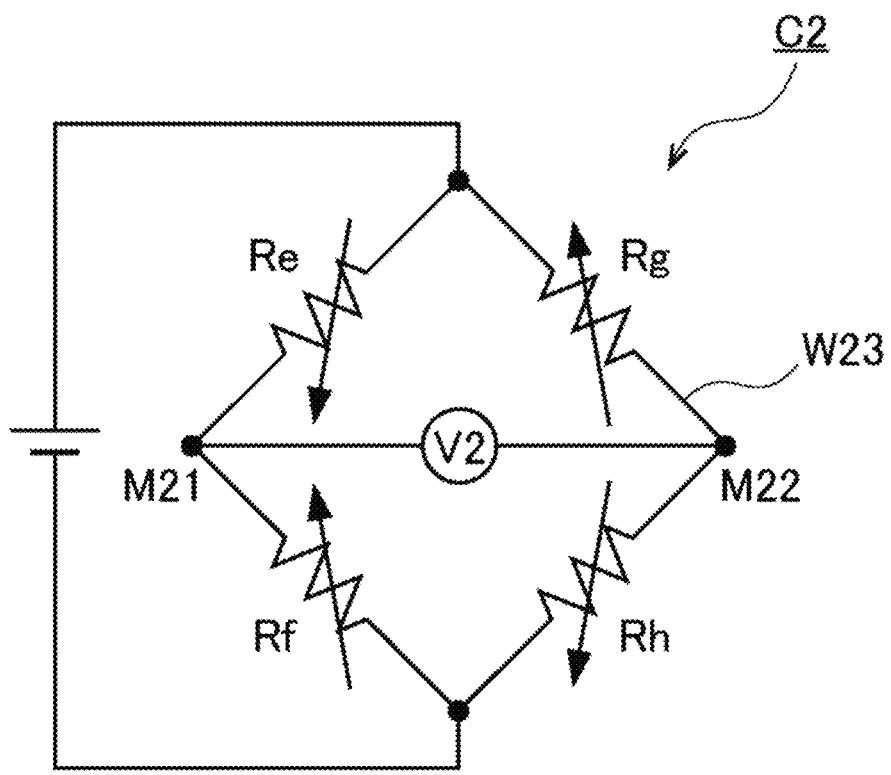
FIG. 8 is a circuit diagram of a second bridge circuit according to a preferred embodiment of the present disclosure.

FIG. 8 is a circuit diagram of a second bridge circuit C2 including four of the second regions Re, Rf, Rg, and Rh of the second resistance wire portion W2. As shown in FIGS. 6 and 8, the second resistance wire portion W2 has a second connection region W23 connected to four second regions Re, Rf, Rg, and Rh. In the present example embodiment, the four second regions Re, Rf, Rg, and Rh are connected via the second connection region W23. Thus, the second bridge circuit C2 is formed.

The second region Re and the second region Rf are connected in series in this order. The second region Rg and the second region Rh are connected in series in this order. Then, the row of the two second regions Re and Rf and the row of the two second regions Rg and Rh are connected in parallel between the + pole and the − pole of the power source voltage. A middle point M21 between the two second regions Re and Rf and a middle point M22 between the two second regions Rg and Rh are connected to a second voltmeter V2.

A resistance value of each of the second sites r2 changes in accordance with torque applied to the region where the resistance wire 412 is arranged. In the present example embodiment, the resistance value of each of the second sites r2 of the four second regions Re, Rf, Rg, and Rh changes in accordance with the torque applied to the base 23. For example, when the base 23 is applied with torque toward one circumferential side about the central axis 9, the resistance value of each of the second sites r2 of the two second regions Re and Rh decreases, and the resistance value of each of the second sites r2 of the other two second regions Rf and Rg increases. On the other hand, when the base 23 is applied with torque toward the other circumferential side about the central axis 9, the resistance value of each of the second sites r2 of the two second regions Re and Rh increases, and the resistance value of each of the second sites r2 of the other two second regions Rf and Rg decreases. As described above, the two second regions Re and Rh and the two second regions Rf and Rg show resistance value changes reversely to each other with respect to the torque.

When the resistance value of each of the four second regions Re, Rf, Rg, and Rh changes, a potential difference between the middle point M21 of the two second regions Re and Rf and the middle point M22 of the two second regions Rg and Rh changes, and thus a measurement value of the second voltmeter V2 also changes. Therefore, the orientation and the magnitude of the torque applied to the base 23 can be detected based on the measurement value of the second voltmeter V2.

As described above, the torque sensor 40 of the present example embodiment includes two bridge circuits of the first bridge circuit C1 and the second bridge circuit C2. Therefore, even when an abnormality occurs in any one of the bridge circuits, the torque can be detected by the other bridge circuit. When an abnormality occurs in any one of the bridge circuits, the abnormality can be detected.

The first bridge circuit C1 and the second bridge circuit C2 may be connected in parallel to a common power source voltage or may be connected to different power source voltages. That is, different power source voltages may be used for each bridge circuit. In a case where different power source voltages are used for each bridge circuit, even when some of the power source voltages fail to function normally, a normal voltage is supplied from another power source voltage to at least one bridge circuit. Therefore, the torque can be detected by the bridge circuit.

As shown in FIG. 5, the torque sensor 40 includes the first terminal 43 and the second terminal 44. That is, the annular body 20 has the first terminal 43 and the second terminal 44. The first terminal 43 and the second terminal 44 are arranged on the base 23. In the present example embodiment, the first terminal 43 and the second terminal 44 are arranged on the surface 231 of the base 23. The first terminal 43 and the second terminal 44 are formed of a conductive metal.

The first terminal 43 is electrically connected to the end of the first resistance wire portion W1. The first resistance wire portion W1 is electrically connected, via the first terminal 43, to a signal processing circuit described below. The second terminal 44 is electrically connected to the end of the second resistance wire portion W2. The second resistance wire portion W2 is electrically connected, via the second terminal 44, to the signal processing circuit described below.

The first terminal 43 is arranged at a first position P1 in the circumferential direction. The second terminal 44 is arranged at a second position P2 in the circumferential direction. The first position P1 and the second position P2 are circumferentially separated from each other. Specifically, a central angle θ formed by the first position P1, the central axis 9, and the second position P2 is equal to or greater than 90° when viewed in the axial direction. Thus, when the first terminal 43 and the second terminal 44 are arranged at circumferentially different positions, it is possible to reduce the probability that a load is simultaneously applied to the first terminal 43 and the second terminal 44, as compared with a case where the first terminal 43 and the second terminal 44 are arranged at the same circumferential position. Therefore, for example, even if one of the first terminal 43 and the second terminal 44 no longer functions, the probability that the other terminal functions can be increased. Therefore, the torque applied to the base 23 can be detected by at least any one of the first resistance wire portion W1 and the second resistance wire portion W2.

When the circumferential width of at least one of the first terminal 43 and the second terminal 44 is wide, the circumferential center of the first terminal 43 is only required to be the first position P1, and the circumferential center of the second terminal 44 is only required to be the second position P2. That is, the central angle θ formed by the first position P1, the central axis 9, and the second position P2 is only required to be defined as a central angle formed by the circumferential center of the first terminal 43, the central axis 9, and the circumferential center of the second terminal.

In FIG. 5, a part of an imaginary line connecting the circumferential center of the first terminal 43 and the central axis 9 and a part of an imaginary line connecting the second terminal 44 and the central axis 9 are each indicated by a broken line. Therefore, the central angle formed by the broken line and the central axis 9 is equal to the central angle θ.

As shown in FIG. 5, in the present example embodiment, the first terminal 43 extends from the end of the first resistance wire portion W1 in a direction away from the central axis 9. The second terminal 44 extends from the end of the second resistance wire portion W2 in a direction away from the central axis 9. This makes it possible to arrange the first terminal 43 and the second terminal 44 at positions further away from each other. This makes it possible to further reduce the probability that a load is simultaneously applied to the first terminal 43 and the second terminal 44. Therefore, for example, even if one of the first terminal 43 and the second terminal 44 no longer functions, the probability that the other terminal functions can be further increased.

When viewed in the axial direction, the central angle θ, formed by the first position P1, the central axis 9, and the second position P2, is more desirably equal to or greater than 175° and equal to or less than 185°. This makes it possible to arrange the first terminal 43 and the second terminal 44 at positions further away from each other. Therefore, it is possible to further reduce the probability that the first terminal 43 and the second terminal 44 are simultaneously disconnected. When viewed in the axial direction, the central angle θ, formed by the first position P1, the central axis 9, and the second position P2, is only required to be, for example, 180°.

The first resistance wire portion W1 and the first terminal 43 are separate members. That is, the first resistance wire portion W1 and the first terminal 43 are manufactured separately and then electrically connected. This can improve the manufacturing efficiency of the torque sensor 40.

Specifically, the torque sensor 40 includes a first anisotropic conductive film 431. That is, the annular body 20 has the first anisotropic conductive film 431. The first anisotropic conductive film 431 is arranged between the first resistance wire portion W1 and the first terminal 43. Specifically, the end of the first resistance wire portion W1 and the end of the first terminal 43 are crimped via the first anisotropic conductive film 431. Due to this, the end of the first resistance wire portion W1 and the end of the first terminal 43 are fixed and electrically connected. Thus, use of the first anisotropic conductive film 431 makes it possible to simultaneously perform fixing and electric connection of the first resistance wire portion W1 and the first terminal 43. This can further improve the manufacturing efficiency of the torque sensor 40.

The second resistance wire portion W2 and the second terminal 44 are separate members. That is, the second resistance wire portion W2 and the second terminal 44 are manufactured separately and then electrically connected. This can improve the manufacturing efficiency of the torque sensor 40.

Specifically, the torque sensor 40 includes a second anisotropic conductive film 441. That is, the annular body 20 has the second anisotropic conductive film 441. The second anisotropic conductive film 441 is arranged between the second resistance wire portion W2 and the second terminal 44. Specifically, the end of the second resistance wire portion W2 and the end of the second terminal 44 are crimped via the second anisotropic conductive film 441. Due to this, the end of the second resistance wire portion W2 and the end of the second terminal 44 are fixed and electrically connected. Thus, use of the second anisotropic conductive film 441 makes it possible to simultaneously perform fixing and electric connection of the second resistance wire portion W2 and the second terminal 44. This can further improve the manufacturing efficiency of the torque sensor 40.

As described above, cyclic flexural deformation occurs in the annular body 20 when the wave reducer 1 is driven. Therefore, an output signal of the first resistance wire portion W1 and an output signal of the second resistance wire portion W2 include a component reflecting torque originally desired to measure and an error component (ripple error) caused by cyclic flexural deformation of the annular body 20. The ripple error changes in accordance with the rotation angle of rotational motion input to the annular body 20.

Therefore, the torque sensor 40 of the present example embodiment performs correction processing (ripple correction) for canceling the ripple error. Hereinafter, this ripple correction will be described.

As shown in FIG. 5, the resistance wire 412 of the present example embodiment further includes a third resistance wire portion W3. The third resistance wire portion W3 is a resistance wire for detecting the rotation angle of rotational motion input to the annular body 20.

The third resistance wire portion W3 has a plurality of third regions Ri, Rj, Rk, Rl, Rm, Rn, Ro, and Rp. In the present example embodiment, the third resistance wire portion W3 has eight of the third regions Ri, Rj, Rk, Rl, Rm, Rn, Ro, and Rp. The plurality of third regions Ri, Rj, Rk, Rl, Rm, Rn, Ro, and Rp are arranged at intervals in the circumferential direction. In the present example embodiment, the eight third regions Ri, Rj, Rk, Rl, Rm, Rn, Ro, and Rp are arranged at equal intervals in the circumferential direction. The plurality of third regions Ri, Rj, Rk, Rl, Rm, Rn, Ro, and Rp are each formed of one conductive wire. Each of the third regions Ri, Rj, Rk, Rl, Rm, Rn, Ro, and Rp expands in an arc shape along the circumferential direction.

Each of the third regions Ri, Rj, Rk, Rl, Rm, Rn, Ro, and Rp includes a third site r3. The third site r3 extends in the circumferential direction. However, the third site r3 extending in the circumferential direction may be repeatedly arranged in the radial direction. The third site r3 may extend in the radial direction. The third site r3 extending in the radial direction may be repeatedly arranged in the circumferential direction.

Figure 9:
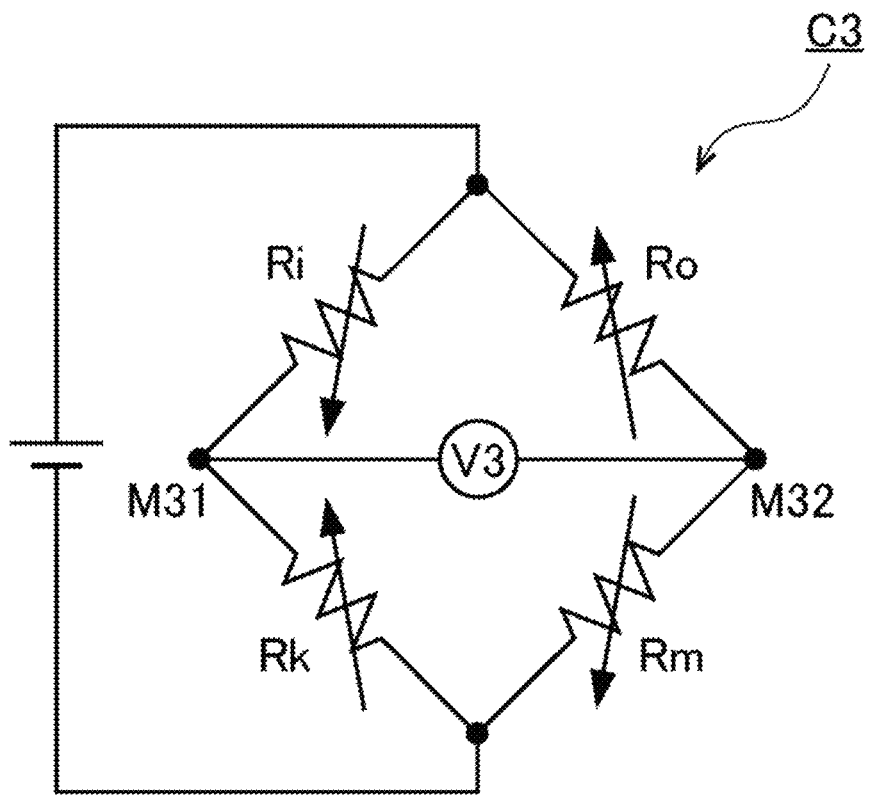
FIG. 9 is a circuit diagram of a third bridge circuit according to a preferred embodiment of the present disclosure.

Among the eight third regions Ri, Rj, Rk, Rl, Rm, Rn, Ro, and Rp, four of the third regions Ri, Rk, Rm, and Ro that are not adjacent to one another are connected to one another to form a third bridge circuit C3. FIG. 9 is a circuit diagram of the third bridge circuit C3. As shown in FIG. 9, the third region Ri and the third region Rk are connected in series in this order. The third region Ro and the third region Rm are connected in series in this order. Then, the row of the two third regions Ri and Rk and the row of the two third regions Ro and Rm are connected in parallel between the + pole and the − pole of the power source voltage. A middle point M31 between the two third regions Ri and Rk and a middle point M32 between the two third regions Ro and Rm are connected to a third voltmeter V3.

Figure 10:
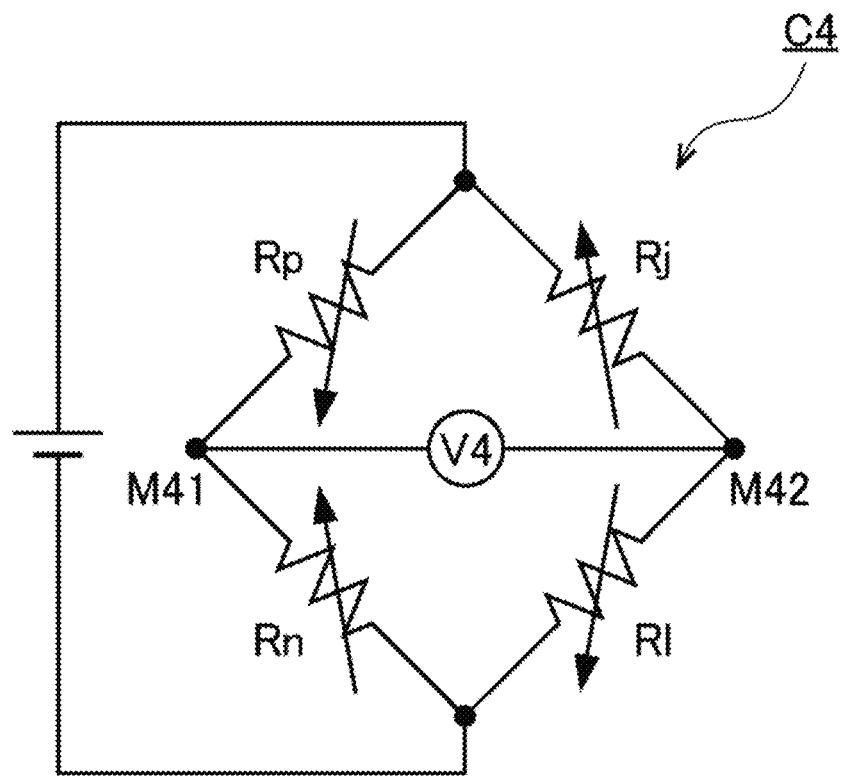
FIG. 10 is a circuit diagram of a fourth bridge circuit according to a preferred embodiment of the present disclosure.

Among the eight third regions Ri, Rj, Rk, Rl, Rm, Rn, Ro, and Rp, the remaining four of the third regions Rj, Rl, Rn, and Rp are connected to one another to form a fourth bridge circuit C4. FIG. 10 is a circuit diagram of the fourth bridge circuit C4. As shown in FIG. 10, the third region Rp and the third region Rn are connected in series in this order. The third region Rj and the third region Rl are connected in series in this order. Then, the row of the two third regions Rp and Rn and the row of the two third regions Rj and Rl are connected in parallel between the + pole and the − pole of the power source voltage. A middle point M41 between the two third regions Rp and Rn and a middle point M42 between the two third regions Rj and Rl are connected to a fourth voltmeter V4.

When the wave reducer 1 is driven, the base 23 of the annular body 20 has generation of a circumferentially elongating part (hereinafter referred to as "elongation part") and a circumferentially contracting part (hereinafter referred to as "contraction part"). Specifically, two elongation parts and two contraction parts are alternately generated in the circumferential direction. That is, the elongation part and the contraction part are alternately generated at intervals of 90° in the circumferential direction about the central axis 9. Then, a location where the elongation part and the contraction part are generated rotates at the first rotational speed.

The resistance value of each of the eight third regions Ri, Rj, Rk, Rl, Rm, Rn, Ro, and Rp changes in accordance with the circumferential elongation and contraction of the base 23. For example, when the above-described elongation part overlaps a certain third region, the resistance value of the third region increases. When the above-described contraction part overlaps a certain third region, the resistance value of the third region decreases.

In the example of FIG. 5, when the contraction part overlaps the third regions Ri and Rm, the elongation part overlaps the third regions Rk and Ro. When the elongation part overlaps the third regions Ri and Rm, the contraction part overlaps the third regions Rk and Ro. Therefore, in the third bridge circuit C3, the third regions Ri and Rm and the third regions Rk and Ro show resistance value changes reversely to each other.

In the example of FIG. 5, when the contraction part overlaps the third regions Rp and Rl, the elongation part overlaps the third regions Rn and Rj. When the elongation part overlaps the third regions Rp and Rl, the contraction part overlaps the third regions Rn and Rj. Therefore, in the fourth bridge circuit C4, the third regions Rp and Rl and the third regions Rn and Rj show resistance value changes reversely to each other.

Figure 11:
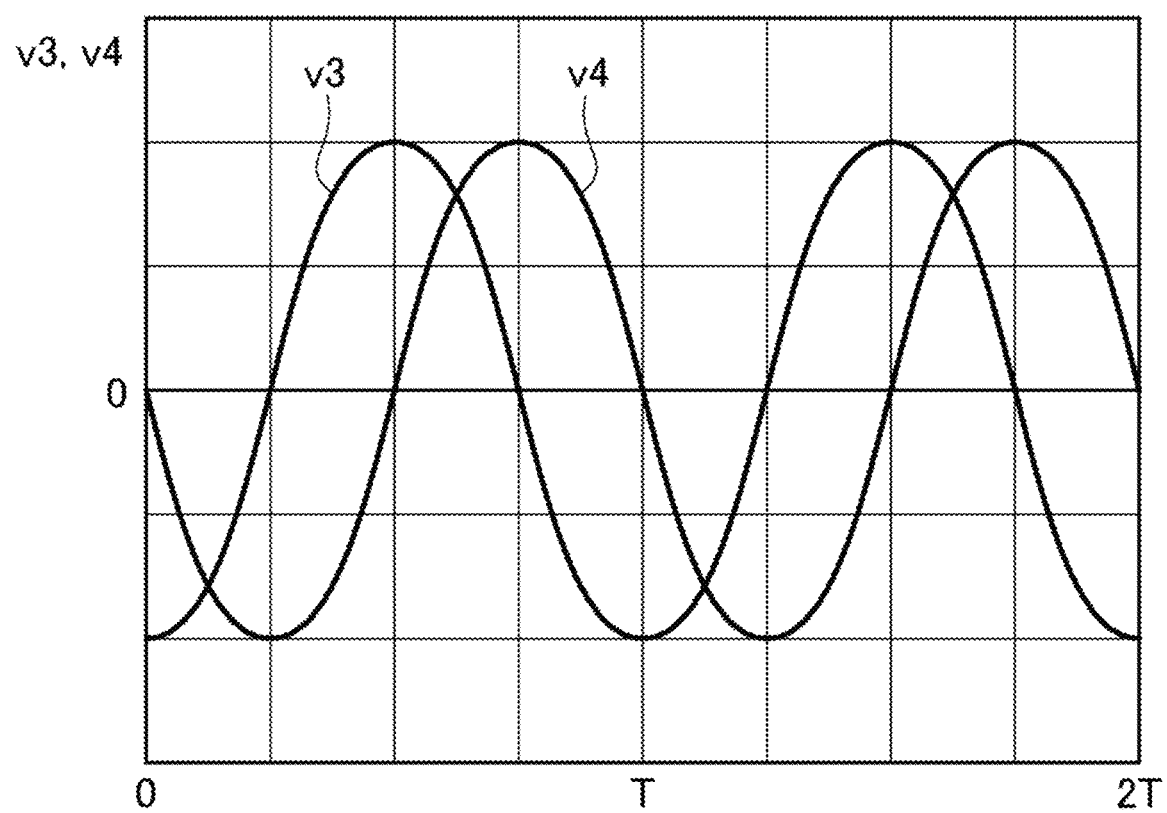
FIG. 11 is a graph showing time change of a measurement value v3 of a third voltmeter of the third bridge circuit and a measurement value of a fourth voltmeter of the fourth bridge circuit.

FIG. 11 is a graph showing time change of the measurement value v3 of the third voltmeter V3 of the third bridge circuit C3 and the measurement value v4 of the fourth voltmeter V4 of the fourth bridge circuit C4. The horizontal axis of the graph of FIG. 11 indicates time. The vertical axis of the graph of FIG. 11 represents a voltage value. When the wave reducer 1 is driven, sinusoidal measurement values v3 and v4 that cyclically change are output from the third voltmeter V3 and the fourth voltmeter V4, respectively, as shown in FIG. 11. A cycle T of the measurement values v3 and v4 corresponds to ½ times a cycle of the first rotational speed. An orientation of the rotational motion to be input can be determined based on whether a phase of the measurement value v4 of the fourth voltmeter V4 is advanced by ⅛ cycle (by ¼ cycle of the measurement values v3 and v4) of the first rotational speed with respect to the phase of the measurement value v3 of the third voltmeter V3, or is delayed by ⅛ cycle (by ¼ cycle of the measurement values v3 and v4) of the first rotational speed with respect to the phase of the measurement value v3 of the third voltmeter V3.

The signal processing circuit described below can detect the rotation angle of the rotational motion input to the annular body 20 based on the measurement value v3 of the third voltmeter V3 and the measurement value v4 of the fourth voltmeter V4. Specifically, for example, the signal processing circuit includes a storage unit that stores a function table in which a combination of the measurement value v3 of the third voltmeter V3 and the measurement value v4 of the fourth voltmeter V4 is associated with the rotation angle. The signal processing circuit outputs the rotation angle by inputting the measurement values v3 and v4 to the function table.

The ripple error changes sinusoidally with respect to a rotation angle of the annular body 20. The signal processing circuit calculates the above-described ripple error in accordance with the rotation angle having been output. Thereafter, the output signal of the first resistance wire portion W1 and the output signal of the second resistance wire portion W2 are corrected using the calculated ripple error. As a result, the signal processing circuit can output, with higher accuracy, the torque applied to the annular body 20.

As described above, the resistance wire 412 of the present example embodiment includes the third resistance wire portion W3. For this reason, it is possible to detect the rotation angle of rotational motion input to the annular body 20. Therefore, he output signal of the first resistance wire portion W1 and the output signal of the second resistance wire portion W2 can be corrected in accordance with the rotation angle.

Without calculating the rotation angle described above, the signal processing circuit may multiply the measurement values v3 and v4 of the third voltmeter V3 and the fourth voltmeter V4 by a predetermined coefficient, and synthesize them with the output signal of the first resistance wire portion W1 and the output signal of the second resistance wire portion W2. This reduces processing load on calculation of the rotation angle. Therefore, it is possible to improve the calculation speed of the signal processing circuit.

In the present example embodiment, the third resistance wire portion W3 is arranged radially outside relative to the first resistance wire portion W1 and the second resistance wire portion W2. However, the third resistance wire portion W3 may be arranged radially inside relative to the first resistance wire portion W1 and the second resistance wire portion W2. The third resistance wire portion W3 may be arranged radially outside the first resistance wire portion W1 and radially inside the second resistance wire portion W2.

The wave reducer 1 further includes a housing 50 and a second substrate 60. As shown in FIG. 2, the housing 50 is positioned on one axial side of the annular body 20. The housing 50 covers the annular body 20 from one axial side. The housing 50 is stationary relative to the annular body 20.

The second substrate 60 is fixed to the housing 50. Therefore, the second substrate 60 rotates at the second rotational speed about the central axis 9 together with the housing 50. Therefore, the second substrate 60 is stationary relative to the first terminal 43 and the second terminal 44.

The second substrate 60 includes the signal processing circuit. The first terminal 43 and the second terminal 44 are electrically connected to the signal processing circuit. Therefore, the signal processing circuit is electrically connected to the first resistance wire portion W1 via the first terminal 43, and is electrically connected to the second resistance wire portion W2 via the second terminal 44. The signal processing circuit is also electrically connected to the third resistance wire portion W3.

The signal processing circuit detects torque applied to the base 23 based on output signals from the first resistance wire portion W1 and the second resistance wire portion W2. More specifically, the signal processing circuit detects the torque applied to the base 23 based on the output signals of the first voltmeter V1 and the second voltmeter V2. The signal processing circuit detects the rotation angle of the rotational motion input to the annular body 20 based on the output signal from the third resistance wire portion W3. More specifically, the signal processing circuit detects the rotation angle of the rotational motion input to the annular body 20 based on the output signals of the third voltmeter V3 and the fourth voltmeter V4.

As described above, the wave reducer 1 of the present example embodiment is equipped with the second substrate 60 having the signal processing circuit. This can unitize the wave reducer 1 and the second substrate 60.

Hereinafter, the first example of the housing 50 will be described.

Figure 12:
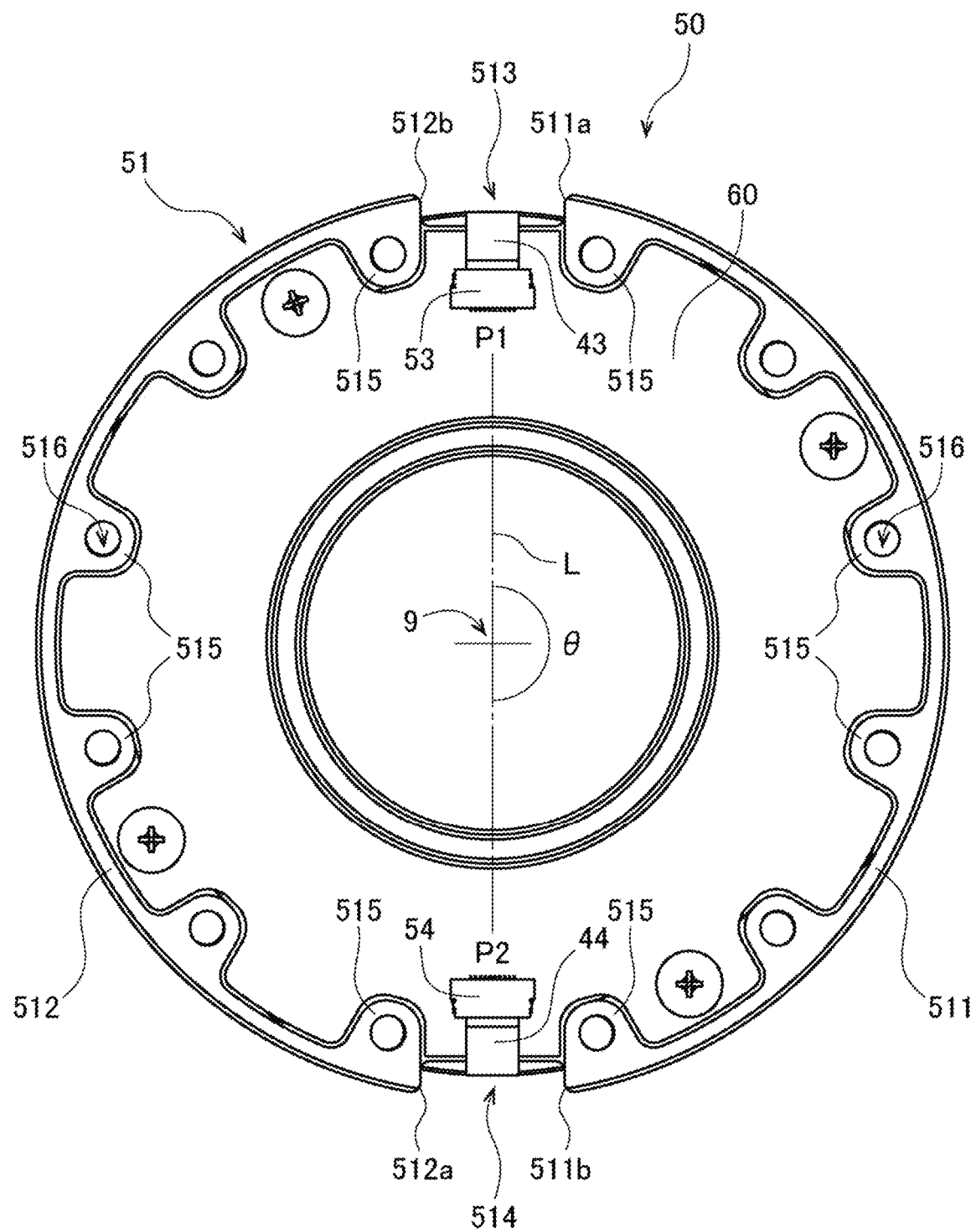
FIG. 12 is a plan view of a housing according to a first example of a preferred embodiment of the present disclosure.
Figure 13:
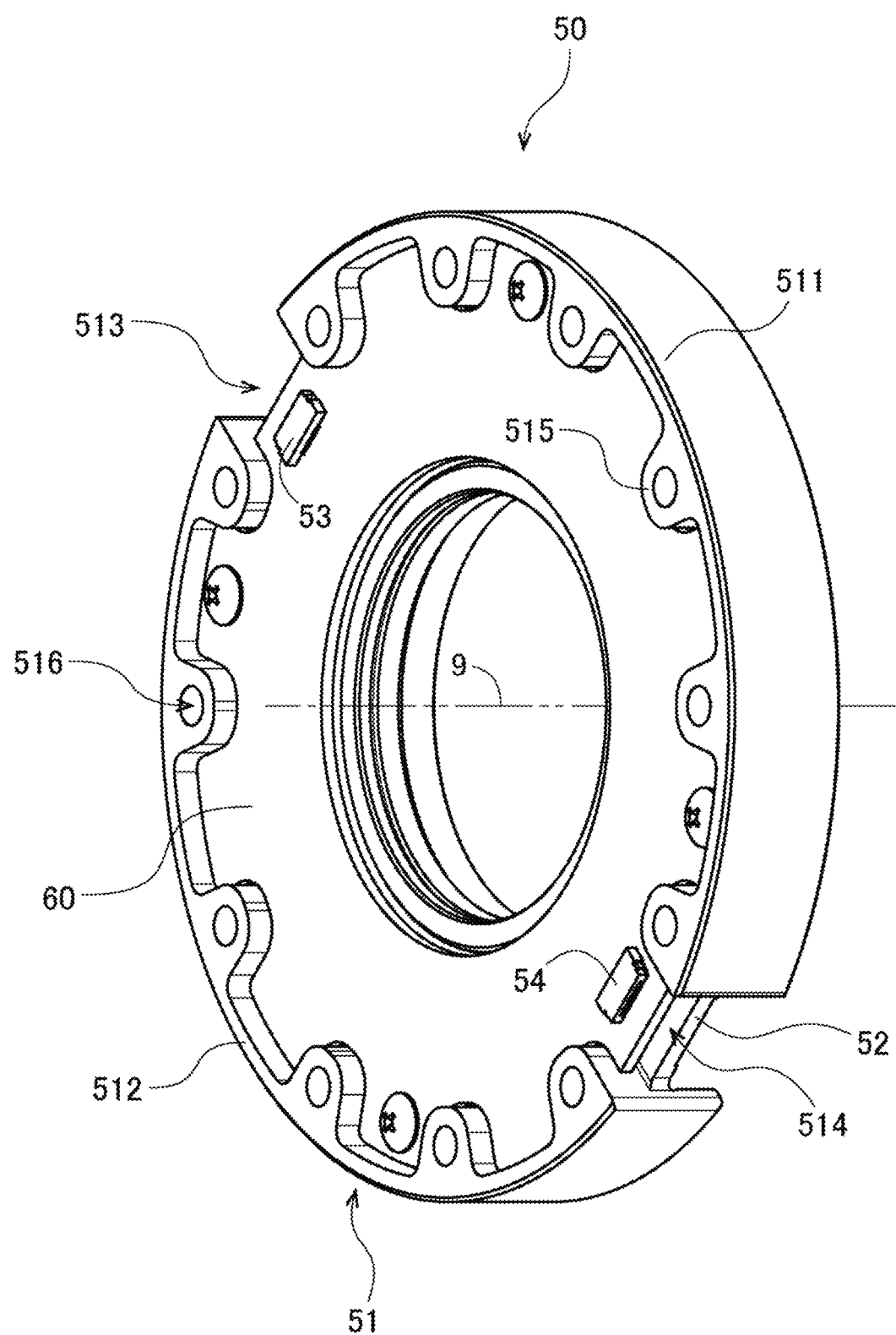
FIG. 13 is a perspective view of the housing according to the first example.

FIG. 12 is a plan view of the housing 50 according to the first example. FIG. 13 is a perspective view of the housing 50 according to the first example. As shown in FIGS. 12 and 13, the housing 50 has a wall portion 51. The housing 50 of the present example further includes a housing base 52. The housing base 52 expands in a direction intersecting the central axis 9. The wall portion 51 protrudes axially from the edge of the housing base 52. The wall portion 51 extends circumferentially. The second substrate 60 is arranged on the radially inside the wall portion 51. This can suppress interference between the second substrate 60 and a site outside the wave reducer 1. By relatively fixing the second substrate 60 and the wall portion 51, positional displacement of the second substrate 60 is suppressed. The second substrate 60 can be easily positioned with respect to the housing 50 at the time of manufacturing the wave reducer 1.

The wall portion 51 of the present example includes a first wall portion 511 and a second wall portion 512. The first wall portion 511 has one circumferential end 511a and another circumferential end 511b. The second wall portion 512 is circumferentially adjacent to the first wall portion 511. The second wall portion 512 has one circumferential end 512a and another circumferential end 512b. A first gap 513 exists between the one circumferential end 511a of the first wall portion 511 and the other circumferential end 512b of the second wall portion 512. A second gap 514 exists between the other circumferential end 511b of the first wall portion 511 and the one circumferential end 512a of the second wall portion 512. The first terminal 43 is arranged in the first gap 513. The second terminal 44 is arranged in the second gap 514. More specifically, the end of the first terminal 43 is arranged in the first gap 513, and the end of the second terminal 44 is arranged in the second gap 514.

Thus, by arranging the first terminal 43 not in the wall portion 51 but in the first gap 513, it is possible to suppress the first terminal 43 from axially protruding from the wall portion 51. By arranging the second terminal 44 not in the wall portion 51 but in the second gap 514, it is possible to suppress the second terminal 44 from axially protruding from the wall portion 51.

As shown in FIG. 12, the housing 50 includes a first connector 53 and a second connector 54. The first connector 53 is arranged radially inward the first gap 513. The second connector 54 is arranged radially inward the second gap 514. The first connector 53 and the second connector 54 are electrically connected to the signal processing circuit.

The first terminal 43 is connected to the first connector 53. Specifically, the first terminal 43 is inserted into the first connector 53. Due to this, the first terminal 43 is electrically connected to the signal processing circuit via the first connector 53. The second terminal 44 is connected to the second connector 54. Specifically, the second terminal 44 is inserted into the second connector 54. Due to this, the second terminal 44 is electrically connected to the signal processing circuit via the second connector 54.

As described above, in the present example, the first terminal 43 is inserted into the first connector 53, and the second terminal 44 is inserted into the second connector 54. Due to this, the first terminal 43 and the second terminal 44 can be easily connected to the signal processing circuit on the second substrate 60.

In the present example, the circumferential length of the first wall portion 511 and the circumferential length of the second wall portion 512 are the same. The circumferential length of the first gap 513 and the circumferential length of the second gap 514 are the same. That is, the circumferential interval between the one circumferential end 511a of the first wall portion 511 and the other circumferential end 512b of the second wall portion 512 and the circumferential interval between the other circumferential end 511b of the first wall portion 511 and the one circumferential end 512a of the second wall portion 512 are the same. Thus, by evenly arranging the first wall portion 511 and the second wall portion 512 in the circumferential direction, it is possible to suppress circumferential variations in the weight of the housing 50.

As shown in FIG. 12, the first wall portion 511 and the second wall portion 512 have a plurality of protrusions 515 protruding radially inward. The plurality of protrusions 515 each have a recess or a hole 516. The housing 50 is fixed to the thick part 24 of the annular body 20 with a bolt. At this time, the bolt is inserted into the recess or the hole 516 of the protrusion 515.

As shown in FIG. 12, the plurality of protrusions 515 are arranged line-symmetrically with respect to a line L connecting the circumferential center of the first gap 513 and the circumferential center of the second gap 514. That is, the plurality of protrusions 515 are arranged line-symmetrically with respect to the line L connecting the circumferential center between the one circumferential end 511a of the first wall portion 511 and the other circumferential end 512b of the second wall portion 512 and the circumferential center between the other circumferential end 511b of the first wall portion 511 and the one circumferential end 512a of the second wall portion 512. Thus, by line-symmetrically arranging the plurality of protrusions 515, it is possible to further suppress circumferential variations in the weight of the housing 50.

As shown in FIG. 12, in the present example, the plurality of protrusions 515 are arranged at equal intervals in the circumferential direction. This can further suppress circumferential variations in the weight of the housing 50.

As shown in FIG. 12, the plurality of protrusions 515 include the protrusion 515 arranged at the one circumferential end 511a of the first wall portion 511, the protrusion 515 arranged at the other circumferential end 511b of the first wall portion 511, the protrusion 515 arranged at the one circumferential end 512a of the second wall portion 512, and the protrusion 515 arranged at the other circumferential end 512b of the second wall portion 512. As described above, by arranging the protrusions 515 at the circumferential ends of the first wall portion 511 and the second wall portion 512, it is possible to improve the rigidity of the first wall portion 511 and the second wall portion 512.

Next, the second example of the housing 50 will be described. Hereinafter, differences from the first example will be mainly described. The equal parts to those of the first example will not be given repeated descriptions.

Figure 14:
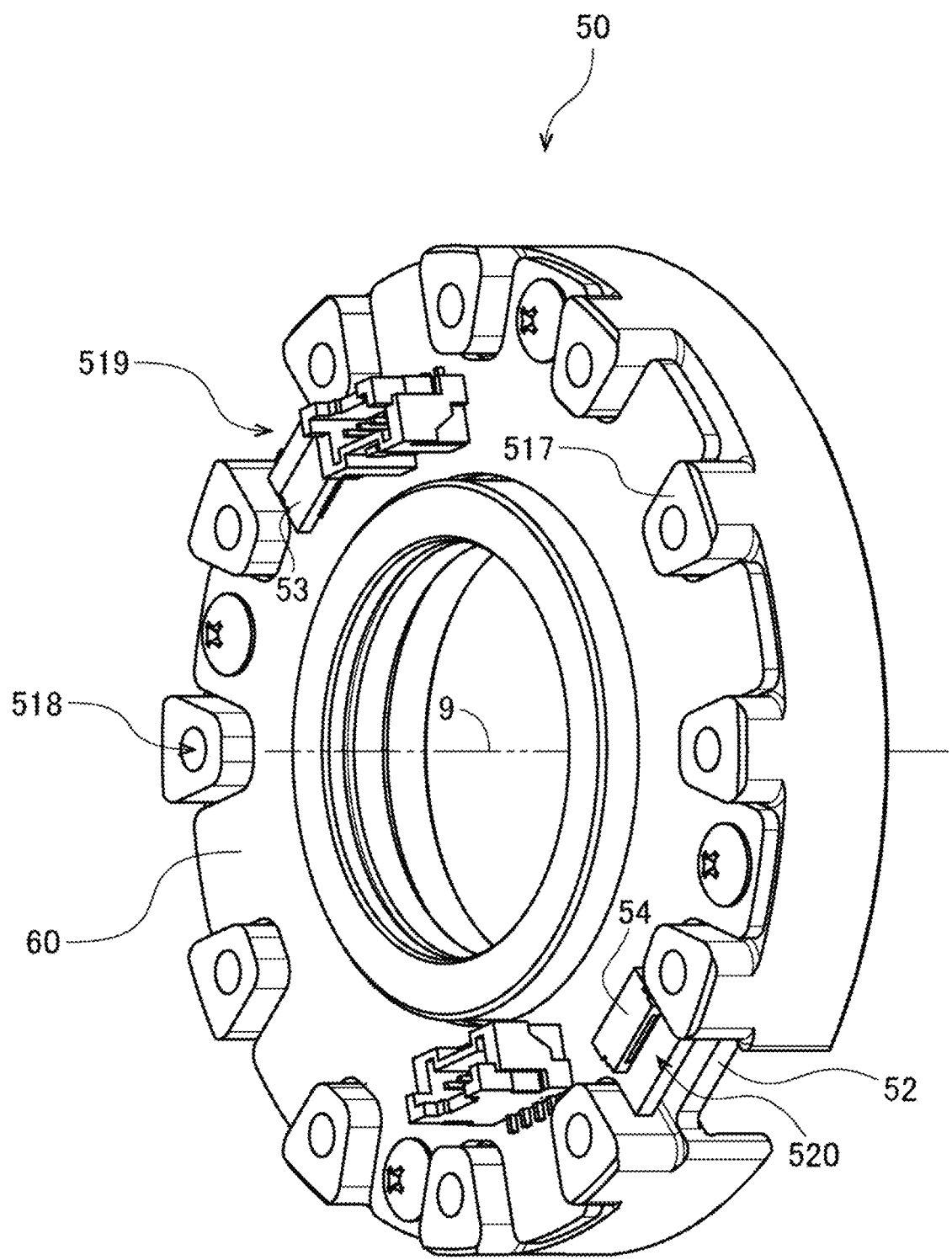
FIG. 14 is a perspective view of a housing according to a second example of a preferred embodiment of the present disclosure.

FIG. 14 is a perspective view of the housing 50 according to the second example. As shown in FIG. 14, the housing 50 includes the housing base 52. The housing base 52 expands in a direction intersecting the central axis 9. The second substrate 60 is arranged on the surface of the housing base 52. More specifically, the second substrate 60 is arranged on the surface on one axial side of the housing base 52. This stably supports the second substrate 60.

As shown in FIG. 14, the housing 50 has a plurality of protrusions 517. The plurality of protrusions 517 protrude axially from the edge of the surface of the housing base 52. More specifically, the plurality of protrusions 517 protrude toward one axial side from the edge of the surface on one axial side of the housing base 52. The plurality of protrusions 517 each have a recess or a hole 518. The housing 50 is fixed to the thick part 24 of the annular body 20 with a bolt. At this time, the bolt is inserted into the recess or the hole 518 of the protrusion 517.

A first gap 519 exists between two protrusions 517 of the plurality of protrusions 517. A second gap 520 exists between other two protrusions 517 of the plurality of protrusions 517. The first gap 519 and the second gap 520 are arranged at circumferentially different positions. The first terminal 43 is arranged in the first gap 519. The second terminal 44 is arranged in the second gap 520. More specifically, the end of the first terminal 43 is arranged in the first gap 519, and the end of the second terminal 44 is arranged in the second gap 520.

Thus, by arranging the first terminal 43 not in the protrusion 517 but in the first gap 519, it is possible to suppress the first terminal 43 from axially protruding from the protrusion 517. By arranging the second terminal 44 not in the protrusion 517 but in the second gap 520, it is possible to suppress the second terminal 44 from axially protruding from the protrusion 517.

As shown in FIG. 14, in the present example, the plurality of protrusions 517 are arranged at equal intervals in the circumferential direction. This can suppress circumferential variations in the weight of the housing 50.

Although the example embodiment of the present disclosure has been described above, the present disclosure is not limited to the above example embodiment.

In the above example embodiment, both the first resistance wire portion W1 and the second resistance wire portion W2 are arranged on the surface on one axial side of the first substrate 41. However, the first resistance wire portion W1 may be arranged on the surface on one axial side of the first substrate 41, and the second resistance wire portion W2 may be arranged on the surface on the other axial side of the first substrate 41. In this case, the first terminal 43 may be arranged on the surface on one axial side of the first substrate 41, and the second terminal 44 may be arranged on the surface on the other axial side of the first substrate 41. In this way, since both surfaces of the first substrate 41 are used, it is possible to widely ensure a region where the first resistance wire portion W1 and the second resistance wire portion W2 are arranged. The first terminal 43 and the second terminal 44 are arranged at positions further away from each other. Therefore, it is possible to further reduce the probability that a load is simultaneously applied to the first terminal 43 and the second terminal 44.

In the above example embodiment, both the first resistance wire portion W1 and the second resistance wire portion W2 are arranged on the surface on one axial side of the base 23. However, the first resistance wire portion W1 may be arranged on the surface on one axial side of the base 23, and the second resistance wire portion W2 may be arranged on the surface on the other axial side of the base 23. In this case, the first terminal 43 may be arranged on the surface on one axial side of the base 23, and the second terminal 44 may be arranged on the surface on the other axial side of the base 23. In this way, since both surfaces of the base 23 are used, it is possible to widely ensure a region where the first resistance wire portion W1 and the second resistance wire portion W2 are arranged. The first terminal 43 and the second terminal 44 are arranged at positions further away from each other. Therefore, it is possible to further reduce the probability that a load is simultaneously applied to the first terminal 43 and the second terminal 44.

In the above example embodiment, both the first resistance wire portion W1 and the second resistance wire portion W2 are arranged on the first substrate 41. However, any one of the first resistance wire portion W1 and the second resistance wire portion W2 may be arranged on the first substrate 41, and the other of the first resistance wire portion W1 and the second resistance wire portion W2 may be arranged on the surface of the base 23 not via the substrate. By arranging at least any one of the first resistance wire portion W1 and the second resistance wire portion W2 on the first substrate 41, it is possible to improve reliability and mass productivity of resistance wires. However, both the first resistance wire portion W1 and the second resistance wire portion W2 may be arranged on the surface of the base 23 not via the substrate.

In the above example embodiment, the wave reducer 1 has one second substrate 60. However, the wave reducer 1 may have two second substrates 60. The two second substrates 60 may be fixed to the housing 50. In this case, the two second substrates 60 each has the signal processing circuit. The first terminal 43 is connected to the signal processing circuit arranged on one of the two second substrates 60. The second terminal 44 is connected to the signal processing circuit arranged on the other of the two second substrates 60. The two second substrates 60 may be stacked and arranged on the surface of the housing 50. This can more widely ensure a region where the signal processing circuit is arranged.

In the above example embodiment, the first terminal 43 is arranged in the first gap of the housing 50, and the second terminal 44 is arranged in the second gap of the housing 50. However, the housing 50 may have a through hole axially penetrating the housing base 52. At least any one of the first terminal 43 and the second terminal 44 may be inserted into the through hole. This can shorten the wiring paths of the first terminal 43 and the second terminal 44.

The housing 50 may have a first terminal insertion part formed of a groove or a hole and a second terminal insertion part formed of a groove or a hole. The first terminal insertion part is, for example, the first gap or the through hole described above. The second terminal insertion part is, for example, the second gap or the through hole described above. The first terminal insertion part and the second terminal insertion part are arranged at circumferentially different positions. The first terminal 43 is inserted into the first terminal insertion part. The second terminal 44 is inserted into the second terminal insertion part.

Thus, when the first terminal 43 and the second terminal 44 are arranged at circumferentially different positions, it is possible to reduce the probability that a load is simultaneously applied to the first terminal 43 and the second terminal 44, as compared with a case where the first terminal 43 and the second terminal 44 are arranged at the same circumferential position. Therefore, for example, even if one of the first terminal 43 and the second terminal 44 no longer functions, the probability that the other terminal functions can be increased. Therefore, the torque applied to the base 23 can be detected by at least any one of the first resistance wire portion W1 and the second resistance wire portion W2.

In the above example embodiment, the first terminal 43 is connected to the first resistance wire portion W1 for detecting the torque applied to the base 23. However, the first resistance wire portion to which the first terminal 43 is connected may be a resistance wire portion for detecting another physical quantity. For example, the first resistance wire portion to which the first terminal 43 is connected may be a resistance wire portion for detecting the rotation angle of the rotational motion input to the annular body 20 as in the third resistance wire portion W3 of the above example embodiment.

In the above example embodiment, the second terminal 44 is connected to the second resistance wire portion W2 for detecting the torque applied to the base 23. However, the second resistance wire portion to which the second terminal 44 is connected may be a resistance wire portion for detecting another physical quantity. For example, the second resistance wire portion to which the second terminal 44 is connected may be a resistance wire portion for detecting the rotation angle of the rotational motion input to the annular body 20 as in the third resistance wire portion W3 of the above example embodiment.

That is, the first resistance wire portion to which the first terminal 43 is connected may be a resistance wire portion having a resistance value changing in accordance with the strain of the base 23. The second resistance wire portion to which the second terminal 44 is connected may be a resistance wire portion having a resistance value changing in accordance with the strain of the base 23 in order to detect the same physical quantity as that of the first resistance wire portion.

Figure 15:
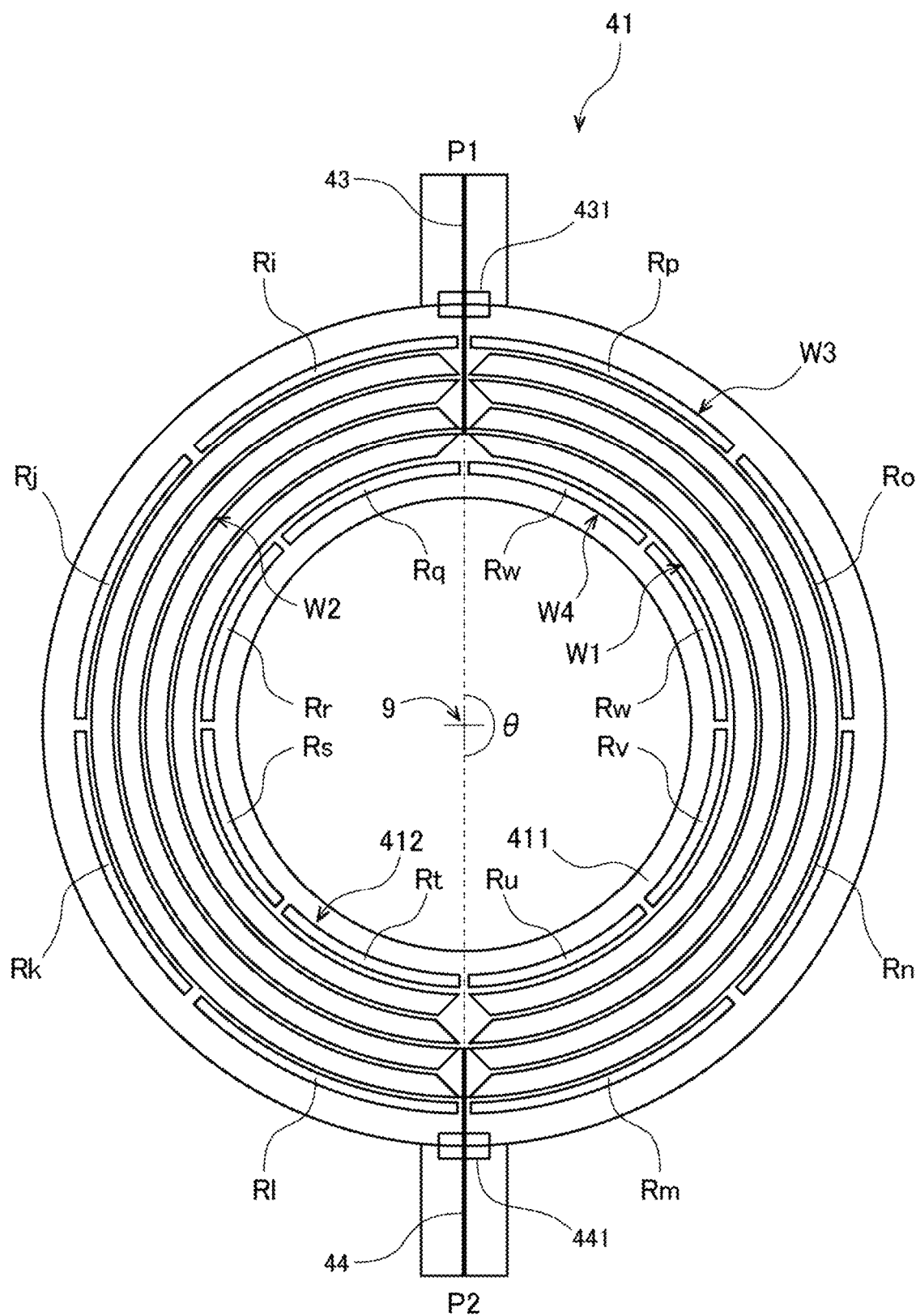
FIG. 15 is a plan view of a first substrate according to an eighth modification of a preferred embodiment of the present disclosure.

In the above example embodiment, the resistance wire 412 includes the third resistance wire portion W3 for detecting the rotation angle of the rotational motion input to the annular body 20. In addition to this, the resistance wire 412 may further include a fourth resistance wire portion W4 for detecting the rotation angle of the rotational motion input to the annular body 20. FIG. 15 is a plan view of the first substrate 41 according to the modification.

Similarly to the third resistance wire portion W3, the fourth resistance wire portion W4 includes a plurality of fourth regions Rq, Rr, Rs, Rt, Ru, Rv, Rw, and Rx. The plurality of fourth regions Rq, Rr, Rs, Rt, Ru, Rv, Rw, and Rx are arranged at intervals in the circumferential direction. The fourth regions Rq, Rr, Rs, Rt, Ru, Rv, Rw, and Rx each have a fourth site extending circumferentially or radially. The four fourth regions Rq, Rs, Ru, and Rw are connected to one another to form a bridge circuit. The four fourth regions Rr, Rt, Rv, and Rx are connected to one another to form a bridge circuit.

In this way, the rotation angle of the rotational motion input to the annular body 20 can be detected not only in the third resistance wire portion W3 but also in the fourth resistance wire portion W4. In the example of FIG. 15, the fourth resistance wire portion W4 is arranged radially inside relative to the first resistance wire portion W1. In this case, for example, the ripple correction of a detection signal of the second resistance wire portion W2 is preferably performed by the detection signal of the third resistance wire portion W3, and the ripple correction of a detection signal of the first resistance wire portion W1 is preferably performed by the detection signal of the fourth resistance wire portion W4.

However, the fourth resistance wire portion W4 may be arranged radially outside the first resistance wire portion W1 and radially inside the second resistance wire portion W2.

The fourth resistance wire portion W4 may be arranged radially outside relative to the second resistance wire portion W2.

The annular body 20 of the above example embodiment is what is called a "hat-shaped" flexible externally toothed gear in which the base 23 expands radially outward from the body 21. The hat-shaped flexible externally toothed gear is excellent in that a space on radially inside the body 21 can be effectively used. However, the annular body 20 may be what is called a "cup-shaped" flexible externally toothed gear in which the base 23 expands radially inward from the body 21. The internally toothed gear 10 may be fixed to the base frame 101, and the annular body 20 may be fixed to the arm 102. In that case, the housing 50 may be a part of a robot arm 102.

In the example embodiment, the wave reducer 1 equipped on the robot 100 has been described. However, the wave reducer 1 having a similar structure may be equipped on another device such as an assist suit or an automatic guided vehicle.

In addition, detailed configurations of the annular body, the wave reducer, and the robot may be appropriately changed without departing from the gist of the present disclosure. The elements appearing in the above example embodiment and modifications may be appropriately combined as long as no contradiction occurs.

The present disclosure is applicable to, for example, an annular body, a wave reducer, and a robot.

Features of the above-described example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. An annular body comprising:
a base surrounding a central axis and expanding in a direction intersecting the central axis;
a first resistance wire having a resistance value changing in accordance with a strain of the base and defining a first bridge circuit;
a second resistance wire having a resistance value changing in accordance with the strain of the base and defining a second bridge circuit;
a first terminal electrically connected to an end of the first resistance wire at a first position in a circumferential direction; and
a second terminal electrically connected to an end of the second resistance wire at a second position in the circumferential direction; wherein
a central angle defined by the first position, the central axis, and the second position is equal to or greater than about 90° when viewed in an axial direction.

2. The annular body according to claim 1, wherein
the first terminal extends from an end of the first resistance wire toward a direction away from the central axis; and
the second terminal extends from an end of the second resistance wire toward the direction away from the central axis.

3. The annular body according to claim 1, wherein the central angle is equal to or greater than about 175° and equal to or less than about 185°.

4. The annular body according to claim 1, wherein
the first resistance wire is on a surface on one axial side of the base; and
the second resistance wire is on the surface on one axial side of the base, and is located radially outside relative to the first resistance wire.

5. The annular body according to claim 1, wherein
the first resistance wire is on a surface on one axial side of the base; and
the second resistance wire is on a surface on another axial side of the base.

6. The annular body according to claim 1, further comprising:
a first substrate fixed to the base; wherein
at least one of the first resistance wire and the second resistance wire is on the first substrate.

7. The annular body according to claim 6, wherein
the first resistance wire is on a surface on one axial side of the first substrate; and
the second resistance wire is on a surface on another axial side of the first substrate.

8. The annular body according to claim 1, wherein
the first terminal and the first resistance wire are defined by separate structures; and
the annular body further includes a first anisotropic conductive film between the first resistance wire and the first terminal.

9. The annular body according to claim 8, wherein
the second terminal and the second resistance wire are defined by separate structures; and
the annular body further includes a second anisotropic conductive film between the second resistance wire and the second terminal.

10. A wave reducer comprising:
the annular body according to claim 1;
a wave generator; and
an internally toothed gear; wherein
the annular body includes:
a tubular body extending in a direction including an axial component from a radial end of the base; and
a plurality of external teeth protruding radially outward from a radially outer surface of the body;
the wave generator is located radially inside the external teeth;
the internally toothed gear is located radially outside the external teeth;
the internally toothed gear includes a plurality of internal teeth protruding radially inward from a radially inner surface; and
a portion of the plurality of external teeth meshes with a portion of the plurality of internal teeth.

11. The wave reducer according to claim 10, further comprising:
a housing that is stationary relative to the annular body; and
a second substrate including a signal processing circuit electrically connected to the first terminal and the second terminal; wherein
the housing includes a wall that extends circumferentially; and
the second substrate is arranged radially inside the wall.

12. The wave reducer according to claim 11, wherein
the wall includes:
a first wall including one circumferential end and another circumferential end; and a second wall circumferentially adjacent to the first wall and including one circumferential end and another circumferential end;
the first terminal is in a first gap between one circumferential end of the first wall and the other circumferential end of the second wall; and
the second terminal is in a second gap between another circumferential end of the first wall and the one circumferential end of the second wall.

13. The wave reducer according to claim 12, wherein the second substrate includes:
a first connector arranged radially inward the first gap; and
a second connector arranged radially inward the second gap;
the first terminal is connected to the first connector; and
the second terminal is connected to the second connector.

14. The wave reducer according to claim 12, wherein
a circumferential length of the first wall and a circumferential length of the second wall are the same;
a circumferential length of the first gap and a circumferential length of the second gap are the same;
the first wall and the second wall include a plurality of protrusions protruding radially inward;
the plurality of protrusions are arranged line-symmetrically with respect to a line connecting a circumferential center of the first gap and a circumferential center of the second gap; and
the plurality of protrusions each include a recess or a hole.

15. The wave reducer according to claim 14, wherein the plurality of protrusions include:
a protrusion at one circumferential end of the first wall;
a protrusion at another circumferential end of the first wall;
a protrusion at one circumferential end of the second wall; and
a protrusion at another circumferential end of the second wall.

16. The wave reducer according to claim 10, further comprising:
a housing that is stationary relative to the annular body; and
a second substrate including a signal processing circuit electrically connected to the first terminal and the second terminal; wherein
the housing includes a housing base extending in a direction intersecting the central axis; and
the second substrate is on a surface of the housing base.

17. The wave reducer according to claim 16, wherein
the housing further includes a through hole axially penetrating the housing base; and
at least one of the first terminal and the second terminal is inserted into the through hole.

18. The wave reducer according to claim 11 comprising two of the second substrates, wherein
the first terminal is connected to the signal processing circuit on one of the two second substrates; and
the second terminal is connected to the signal processing circuit arranged on another of the two second substrates.

19. A wave reducer comprising:
an annular body;
a wave generator;
an internally toothed gear; and
a housing that is stationary relative to the annular body; wherein
the annular body includes:
a base surrounding a central axis and expanding in a direction intersecting the central axis;
a first resistance wire having a resistance value changing in accordance with strain of the base;
a second resistance wire having a resistance value changing in accordance with the strain of the base;
a first terminal electrically connected to an end of the first resistance wire at a first position in a circumferential direction;
a second terminal electrically connected to an end of the second resistance wire at a second position in the circumferential direction;
a tubular body extending in a direction including an axial component from a radial end of the base; and
a plurality of external teeth protruding radially outward from a radially outer surface of the body;
the wave generator is radially inside the external teeth;
the internally toothed gear is radially outside the external teeth;
the internally toothed gear includes a plurality of internal teeth protruding radially inward from a radially inner surface;
a portion of the plurality of external teeth meshes with a portion of the plurality of internal teeth;
the housing includes:
a first terminal insertion portion including a groove or a hole; and
a second terminal insertion portion including a groove or a hole at a position circumferentially different from the first terminal insertion portion;
the first terminal is inserted into the first terminal insertion portion; and
the second terminal is inserted into the second terminal insertion portion.

20. A robot comprising the wave reducer according to claim 10.

* * * * *